United States Patent [19]
Willhoff et al.

[11] Patent Number: 6,049,715
[45] Date of Patent: Apr. 11, 2000

[54] METHOD AND APPARATUS FOR EVALUATING A RECEIVED SIGNAL IN A WIRELESS COMMUNICATION UTILIZING LONG AND SHORT TERM VALUES

[75] Inventors: Steven J. Willhoff; Paul S. Meche, both of Richardson; John S. Mayes, Dallas; Lance Miguel LaBauve, Plano; Mark Bruce Pyle, Richardson, all of Tex.

[73] Assignee: Nortel Networks Corporation, Montreal, Canada

[21] Appl. No.: 08/803,408

[22] Filed: Feb. 20, 1997

Related U.S. Application Data

[63] Continuation-in-part of application No. 08/252,553, Jun. 1, 1994, abandoned, which is a continuation-in-part of application No. 08/558,980, Nov. 13, 1995, abandoned.

[51] Int. Cl.$^7$ .............................. H04Q 7/34; H04B 17/00
[52] U.S. Cl. ...................... 455/436; 455/437; 455/438; 455/525; 455/67.1; 455/226.2
[58] Field of Search ................................. 455/436, 437, 455/438, 439, 442, 443, 444, 517, 67.1, 226.1, 226.2, 525

[56] References Cited

U.S. PATENT DOCUMENTS

| | | | |
|---|---|---|---|
| 3,539,924 | 11/1970 | Daskalakis et al. . | |
| 4,556,760 | 12/1985 | Goldman | 179/2 EB |
| 4,613,990 | 9/1986 | Halpren | 455/33.1 |
| 4,718,081 | 1/1988 | Brenig | 379/60 |
| 5,123,112 | 6/1992 | Choate | 455/56.1 |
| 5,148,548 | 9/1992 | Meche et al. | 455/34.1 |
| 5,157,661 | 10/1992 | Kanai et al. | 370/95.1 |
| 5,157,709 | 10/1992 | Ohteru | 379/58 |
| 5,170,485 | 12/1992 | Levine | 455/436 X |
| 5,260,943 | 11/1993 | Comroe et al. | 370/95.1 |
| 5,265,119 | 11/1993 | Gilhousen | 375/1 |
| 5,267,261 | 11/1993 | Blakeney, II et al. | 375/205 |
| 5,349,630 | 9/1994 | Sointula | 379/58 |
| 5,379,446 | 1/1995 | Murase | 455/56.1 X |
| 5,406,615 | 4/1995 | Miller, II et al. | 455/33.2 X |
| 5,444,862 | 8/1995 | Hibino | 455/67.1 |

FOREIGN PATENT DOCUMENTS

| | | |
|---|---|---|
| 0 465 443 | 1/1992 | European Pat. Off. . |
| WO 91/19403 | 12/1991 | WIPO . |

OTHER PUBLICATIONS

"Cellulalr System Dual–Mode Mobile Station Base Station Compatibility Standard", EIA/TIA, IS–54–B, PN3011–1, Apr. 8, 1994.

"Dual–Mode Mobile Staton–Base Station Compatibility Standard", EIA/TIA, IS–54, PN2215, Dec. 1989.

*Primary Examiner*—Wellington Chin
*Assistant Examiner*—Philip J. Sobutka
*Attorney, Agent, or Firm*—Foley & Lardner

[57] ABSTRACT

A long term average and a short term value of the strength of a received signal is used to determine a trigger condition in a mobile communications system to perform such functions as control channel or traffic channel reselect. The long term average removes the effects of short term fades in the short term signal that otherwise may cause a premature trigger decision. The short term value offsets historical bias that may be built into long term average. The actual trigger is only realized when both the long term average and the short term value exceed predetermined thresholds in a positive or negative direction.

23 Claims, 18 Drawing Sheets

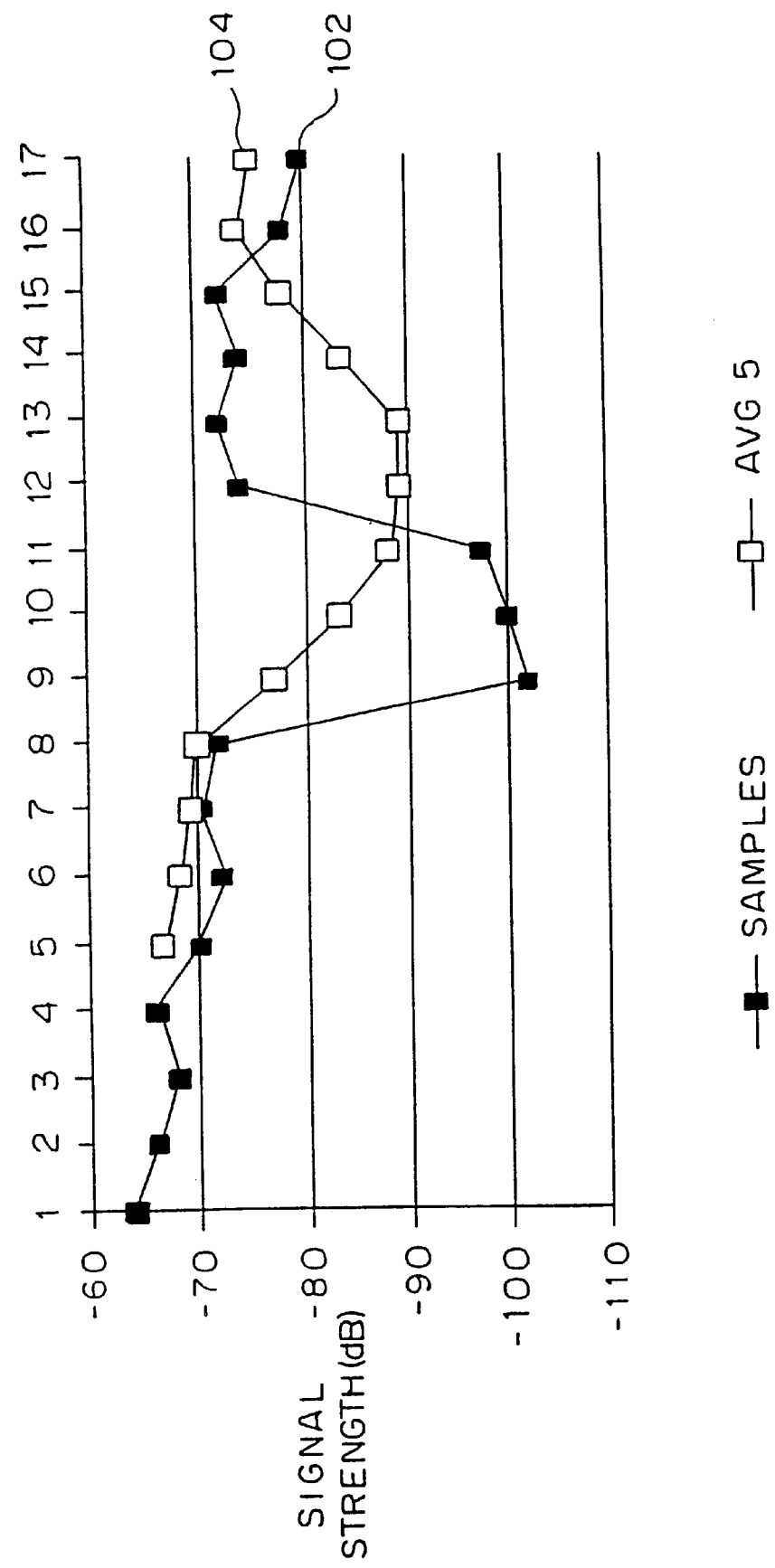

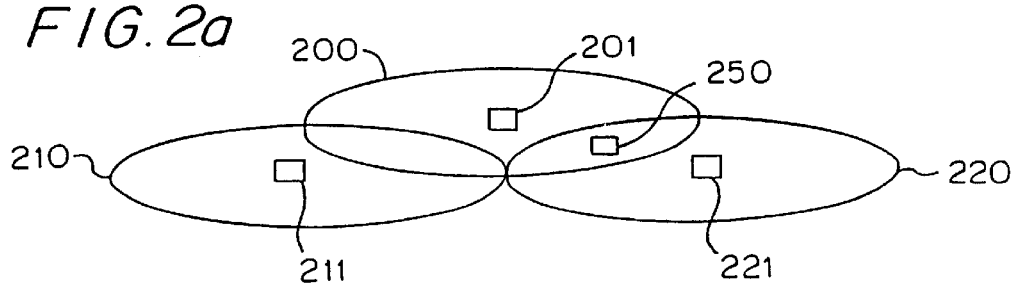
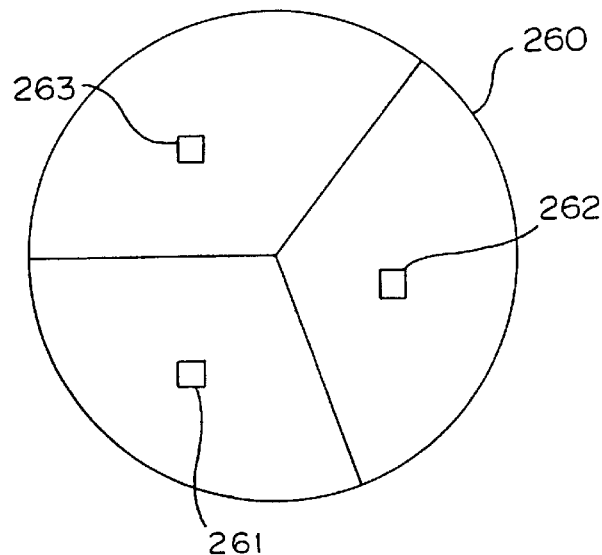
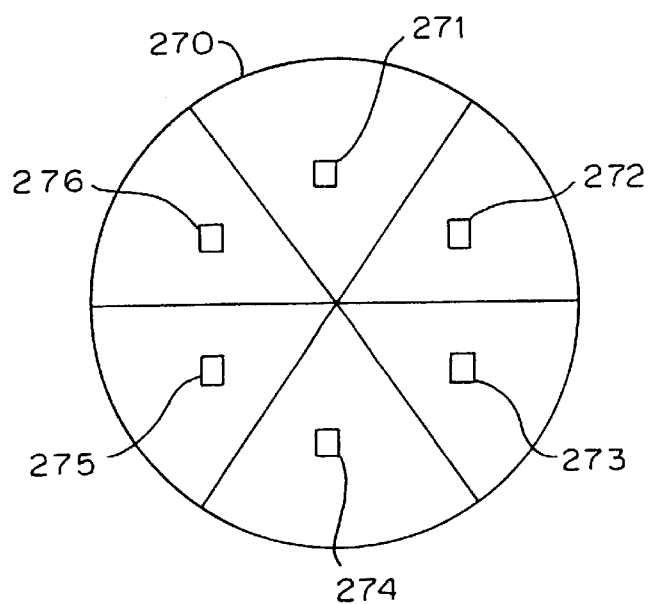

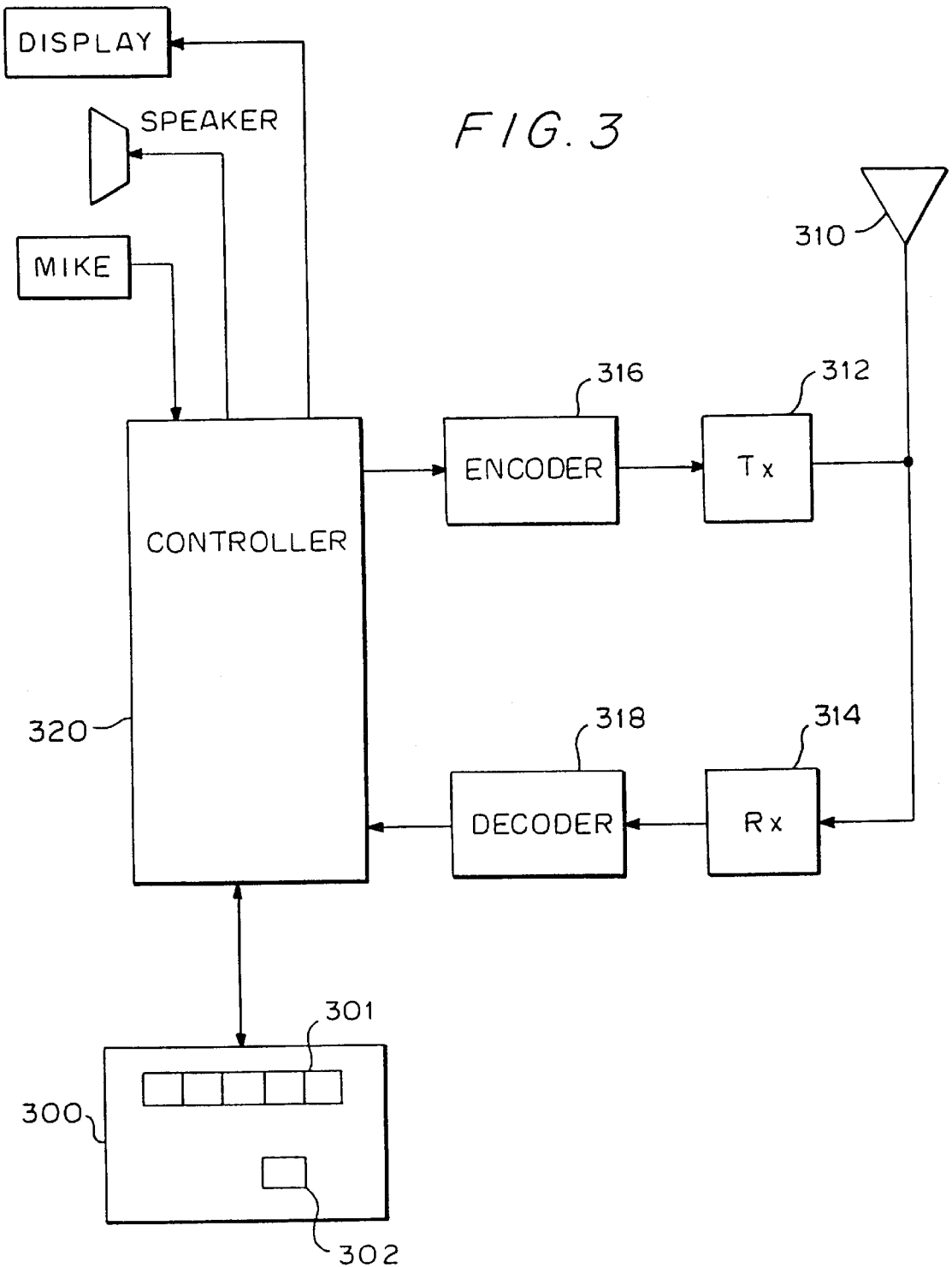

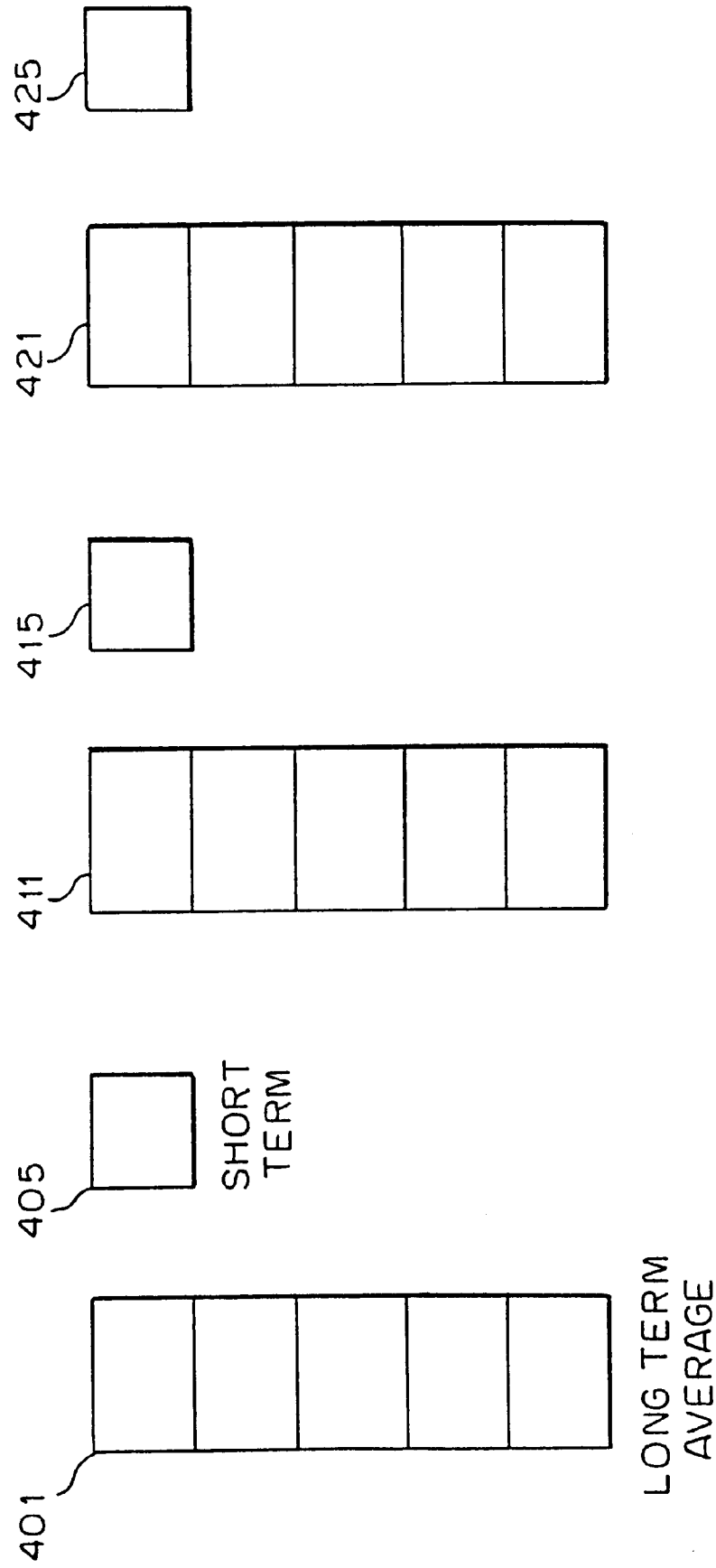

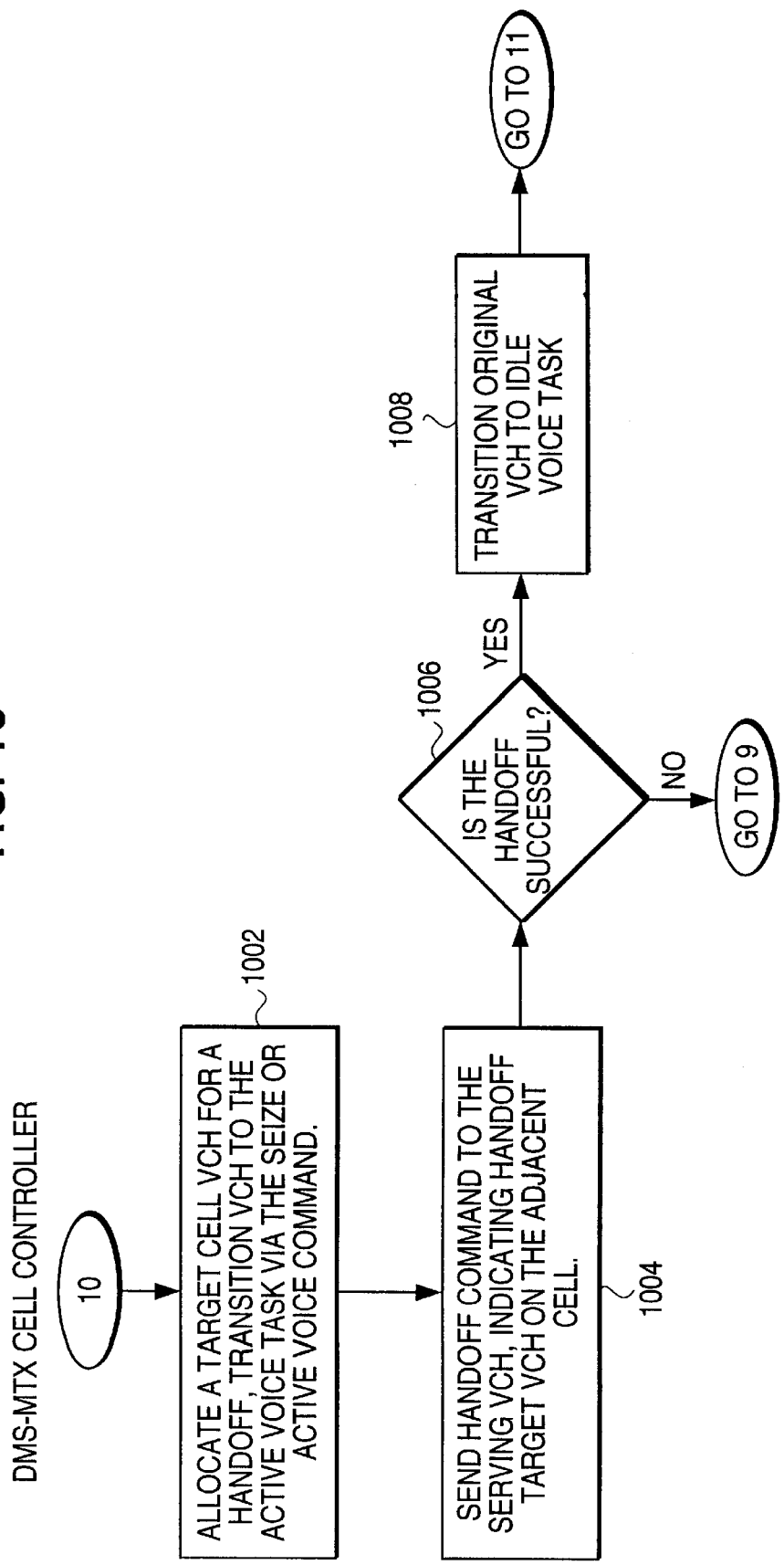

METHOD AND APPARATUS FOR EVALUATING A RECEIVED SIGNAL IN A WIRELESS COMMUNICATION UTILIZING LONG AND SHORT TERM VALUES

This application is a Continuation-in-Part of U.S. application Ser. No. 08/252,553, filed Jun. 1, 1994, and a Continuation-in-Part of U.S. application Ser. No. 08/558,980, filed Nov. 13, 1995, which is related to U.S. application Ser. No. 08/057,970, filed May 7, 1993 and all now abandoned.

BACKGROUND OF THE INVENTION

1. Field of the Invention

The invention relates generally to a method and apparatus for determining and executing correct handoff decisions in a wireless communications system. Specifically, the invention involves determining the correct handoff time (decisions) based on both a long term and short term measurement of the signal level.

2. Description of the Related Art

When a wireless station is in "standby" mode waiting to initiate a call or to receive a call, the wireless station locks onto or tunes to a particular control channel (CCH). As a mobile wireless station moves around geographically, the mobile station must periodically change to a different CCH according to certain criteria.

It is important to accurately evaluate a received signal in order to, e.g., correctly detect the need to switch to a new control channel (CCH) at the appropriate coverage point. This helps maintain both the integrity of the frequency plan defined by a wireless operator, as well as the wireless subscriber's service quality. A mobile station utilizes the signal strength of the CCH to help determine when to switch to a new CCH.

Also, the ability of a base station, also called a land station, to correctly measure a received signal strength of a mobile station is a core building block of this system requirement. The land station must provide a precise and consistent measure of the mobile station's signal strength. The land station must react appropriately to changes in the signal, without overreacting to signal fluctuations prevalent in radio signals due to fading conditions. Overreacting to fluctuating signals can have as detrimental an impact to proper frequency containment as not being sufficiently reactive to true handoff conditions.

Several approaches currently exist to assess a received signal strength. Basic categories can be categorized as "short term" and "long term" approaches.

Methods that rely exclusively on short term measurements are subject to error due to the highly fluctuating nature of the signal. These methods rely on periodic sampling of the signal at intervals of several milliseconds or seconds. This practice often contributes to poor decisions due to the long latencies that may exist between measurements and the effects of short fades on the signal.

Methods that utilize continual measurements at relatively frequent intervals and then average them over a 'long' period of time provide a more even view of the received signal. This averaging approach or long term method, smooths out the affects of short term fades in the signal. Thus, "long" term methods are less over reactive to fluctuating signals. However, averaging methods are flawed since they may build in a historical bias to the signal strength average.

In mobile wireless systems, methods that average over long periods of time tend to include measurements from different geographic locations. Therefore, the long term average may also contain a spatial historical bias. In other words, using an average at a current location to evaluate a CCH signal at the current location can be biased by measurement samples from other geographic locations taken previously. Thus, the historical bias may trigger action based on events that occurred not only in the past, but also in different geographic locations. This historical bias can occur frequently in an urban environment due to the shadowing effects of buildings.

A more specific example of how shadowing can cause the historical bias to cause an erroneous trigger condition is as follows. As a mobile is subjected to a shadow effect, older, higher strength, measurements are replaced in the average by more current, lower strength, measurements and the average signal strength begins to fall. This is consistent with the characteristics of averaging algorithms being a "trend follower." As the mobile begins to move out of the shadow effect, the actual current signal strength begins to rise but the long term average keeps falling. Thus, the long term average can indicate that action is required (e.g. CCH reselect) when in fact action is not required at the instant the trigger, indicating the need to reselect a CCH, is invoked.

Overreacting to fluctuating signals can have a detrimental impact on a wireless station's battery life and therefore operational time and also increases transaction processing on the switching system. Additionally, overreacting increases the possibility of missing terminations (incoming calls) since the mobile station would be involved in unnecessary reselection processing. Not reacting quickly enough to changing signal conditions can result in service interruption and expensive processing to re-acquire service.

Another shortcoming of the long term averaging method is that the RSSI (Received Signal Strength Indication) reported at the time of a handoff trigger contains the smoothed average of the signal over a relatively long time interval. In a truly falling signal scenario, this long term representation of the signal is typically much stronger than the actual current signal. This impacts the effectiveness of the handoff process because a target cell selection is based on which of the adjacent cells measure a signal stronger than the value reported by the source cell (usually using a hysteresis mechanism added to the source measurement). The effect of the long term signal representation on this process is that the signal strength of the adjacent cells often may not exceed the long term representation of the source signal, even though the adjacent cells would be able to exceed the current signal strength value of the source signal by the hysteresis. As a result, handoff action is delayed, which may cause both a violation of the frequency plan as well as reduced voice quality to the mobile subscriber as the signal continues to degrade.

SUMMARY OF THE INVENTION

It is therefore an object of the invention to provide a dual stage method and apparatus for accurately evaluating a received signal by providing a mobile station with a concise and consistent measure of a received signal strength, in order to perform such tasks as determining a signal strength based trigger to reselect a control channel (CCH) or a traffic channel.

It is a further object of this invention to determine the signal strength based trigger at the appropriate coverage point and in a manner that overcomes the shortcomings found in single stage (short or long term) received signal evaluation approaches.

It is an object of the invention to avoid poor trigger decisions caused by the highly fluctuating nature of the signal, e.g. short term fades in the signal, as well as to eliminate the occurrence of false triggers caused by the historical bias that may exist from a long term averaging process.

It is a further object of the invention to avoid premature handoff decisions due to the effects of short fades on the signal. It is a further object of the invention to avoid a handoff decision that is not sufficiently reactive to a true handoff condition due to the relatively large latency that may exist between short term measurements.

It is also an object of the invention to address the problem of delaying the handoff due to an adjacent cell measurement being unable to exceed the historically biased long term average signal strength representation found in a pure averaging system.

A dual stage approach may be used to indicate a signal strength based trigger condition when the strength of the received signal from the serving control channel falls below a predetermined threshold or when the strength of a neighboring control channel is above a predetermined threshold.

These and other objects of the invention are accomplished by maintaining both a long term representation of the signal and a short term representation of the current signal level. A signal strength based trigger condition exists if both the long term average and short term value exceed a predetermined threshold. The cellular system compares the long term representation to a threshold value to determine an initial trigger for a reselect condition. The averaging process removes the effects of short term fades in the signal that may cause a premature reselect decision due to these short term signal fluctuations. This initial trigger is then qualified by examining the short term current value of the signal. The actual signal strength based trigger is only realized when both long and short term values exceed appropriate threshold values.

The cellular system requires certain information to develop and maintain the long term averages and short term values. This information includes which control channels are available and appropriate threshold values associated with both the potential control channels and the serving control channel. Additionally, the cellular system must know how often to sample each control and/or traffic channel to update the long term average and short term values of the received signal strength of the associated control and/or traffic channel.

This approach eliminates the occurrence of false handoff triggers exhibited by the historical bias that may exist from the averaging process. Additionally, a method according to the invention reports the short term signal strength value as a mobile station's signal strength for comparisons to the signal strength measured on the adjacent cells. Since this short term value more closely represents the current measure of the signal rather than a long term average, it provides a truer comparison with the current measurements made on the adjacent cells.

According to one embodiment of the invention, a method is provided for correctly determining when a phone call on a mobile station in a cellular system on a particular voice channel in one cell site should be handed off to a voice channel in another cell site. A first signal value, indicative of a long term averaged signal strength of the signal received from the mobile station, is compared to a predetermined threshold value. A second signal value, indicative of the short term value of the received signal strength, is compared to the threshold value if the first signal value is below the threshold value. A handoff condition exists if both the first and second signal values are below the threshold.

The Dual Stage RSSI handoff trigger approach according to the invention balances the effects of the long term signal characteristics with the current, short term, assessment of the signal, thereby providing a method that is superior to single stage methods of handoff trigger detection.

The benefits to the cellular system operation with respect to handoff conditions detection provided by the Dual Stage RSSI handoff Trigger method according to the invention over single stage handoff detection methods are threefold. First, the signal strength measurements are not over reactive to fluctuating signals. Second, the signal strength measurements are not negatively affected by the historical bias built into averaging. Third, the integrity of the comparisons to adjacent cell signal strength measurements is not compromised due to the historical bias built into averaging. These three factors provide for a consistent and stable handoff detection method that prevents both premature and delayed handoff condition triggers. This positively effects the mobile subscriber's call quality, and maintains channel coverage within the cellular operators frequency plan.

Additional features and advantages of the invention will be made clear from the accompanying drawings and the following detailed description.

BRIEF DESCRIPTION OF THE DRAWINGS

FIG. 1 shows a graph of the short term and long term measurements of a received signal;

FIG. 2a shows the cell environment in which the present invention may be practiced;

FIGS. 2b and 2c show other cell structures in which the present invention may be practiced;

FIG. 3 shows a block diagram of a Mobile Station;

FIG. 4 shows an example of long term and short term sample buffers;

FIGS. 16–18 show the steps of the DMS-MTX Cell Controller in controlling handoff sequences of a base station.

DETAILED DESCRIPTION OF THE PREFERRED EMBODIMENTS

Figure 5:
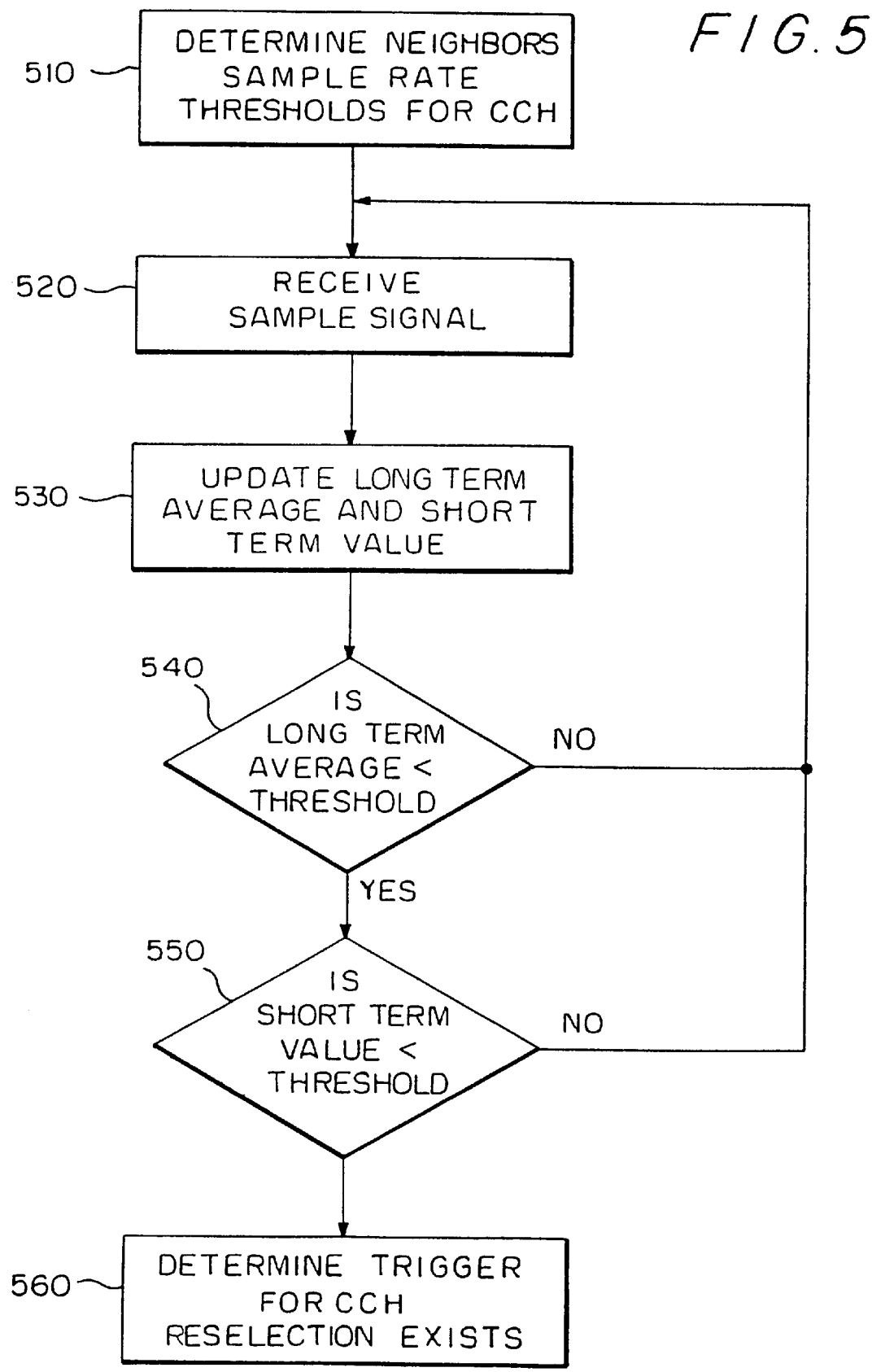
FIG. 5 shows a flow diagram of a first embodiment of the invention.

Referring to FIG. 1, curves for both short term values (individual samples) 102 and a long term (five sample)

average 104 are shown indicating the strength of a received signal. This received signal may be from a serving control channel, an adjacent control channel or a traffic channel. As can be seen in FIG. 1, the long term average generally tracks the trend of the short term average. The rapid decrease in the received signal strength, typical of the shadow effect, is shown by samples 8–11 of the short term values. If only a short term signal strength representation were used, an erroneous trigger event could occur. When the strength of the received signal is rising, as shown in samples 10–13, the long term average does not reflect the improvement in the present signal strength until sample 14, potentially leading to an erroneous trigger condition if only the long term average is utilized. A dual stage triggering approach applied to the data shown in FIG. 1 does not result in the erroneous triggers associated with single stage approaches, since both the long and short term values must fall below threshold values to cause a trigger.

FIGS. 2a–2c show the environment in which the dual stage method and apparatus of the present invention operates and where the samples shown in FIG. 1 may be received by a mobile station. In FIG. 2a, a mobile station 250 is traveling in an overlapping region of cell sites 200 and 220, which are respectively controlled by controllers 201 and 221. The dual stage trigger approach of the present invention balances the effects of the long term signal characteristics with the current, short term, assessment of the signal so that the mobile performs the appropriate trigger detection to switch to an appropriate control channel at the appropriate time.

FIGS. 2b and 2c depict alternate cell structures. In FIG. 2b the region 260 is divided into three (120°) cells with cell controllers 261, 262 and 263 provided for each of the cells. FIG. 2c shows region 270 divided into six (60°) cells with cell controllers 271–276 provided for the corresponding cells.

Assuming that mobile 250 is presently locked onto CCH 201 (i.e. CCH 201 is the serving CCH), mobile 250 maintains a list of potential new control channels. In some embodiments, this information relating to neighboring control channels may be provided by the serving CCH. In other embodiments the control channels are assigned predetermined frequencies and the mobile determines adjacent control channels by sampling the control channel frequencies. The mobile samples these specific control channel frequencies looking for an appropriate new serving CCH.

As shown, in FIG. 2a, control channels 211 and 221 are determined to be neighboring control channels. In some systems control channels are designated by a frequency. In other systems a control channel may be designated according to a time slot or a code value (e.g., for spread spectrum applications) on a particular frequency. In order to maintain service quality, mobile 250 must determine when to switch from CCH 201 to neighboring control channels 211 or 221 according to the received signal strength of the neighboring control channels as well as the received signal strength of the serving CCH as monitored by the mobile station. In addition to identifying a control channel by frequency (or time slot or code) and type, the mobile must also determine appropriate thresholds and sampling intervals. This information can be provided by the serving CCH or be predetermined according the kind of system in which the mobile is operating.

This approach is equally suited to evaluating the received signal strength of serving and neighboring traffic channels and switching traffic channels according to the dual stage approach.

The mobile is shown conceptually in FIG. 3. The mobile contains antenna 310, transmitter and receiver 312 and 314, encoder and decoder 316 and 318, and controller 320, the controller 320 including a processor. The antenna 310 and receiver 314 allow the mobile to receive a signal and to determine the strength of the received signal. The particular details comprising the mobile unit are well known and conventional in the art and certain details are therefore not included in the figure. Mobile 250 contains memory 300 in which the table of control channels and related information, along with long and short term averages, 301 and 302, may be stored.

When the mobile 250 locks onto CCH 201, the mobile determines adjacent control channels or is provided this information by the serving CCH 201. The mobile station periodically monitors the signal strength of each CCH on the table of adjacent control channels as well as the serving CCH on which the mobile is presently tuned. The mobile uses these periodically monitored signals to establish and update a long term average and short term value for each CCH, as shown, e.g., in FIG. 4.

Thus, the mobile will maintain a long term average 401, 411, 421 for each identified neighbor as well as for the serving control channel. The long term average consists of the average of the most recent series of short term signal strength measurements, as shown in FIG. 4. Of course, the number of samples making up the long term value can vary.

The mobile will also maintain a short term value of signal strength 405, 415, 425 for each neighbor as well as for the serving CCH. While the short term measurements 405, 415 and 425 are depicted in FIG. 4 as being comprised of one sample, it is also possible to use an average of several samples to form the short term sample. Averaging over several measured samples to obtain the short term signal strength measurement avoids problems associated with Rayleigh fades, which can be a frequent occurrence in the mobile communications environment.

By way of example, four samples may be used to form a short term signal strength measurement. In other words, the short term value is an average of several samples. The long term average is an average of the short term values. Thus, e.g., if the long term average contains five short term values, the long term average in this scenario, would be an average of 20 actual samples. Other numbers of samples can of course be used to determine the short term signal strength value as well as the long term average.

The mobile must also sample each CCH at an appropriate interval. As previously discussed, this sampling rate may be provided by the CCH on which the mobile is tuned, or can predetermined and loaded into program memory of controller 320, according to particular system requirements and capabilities.

In one embodiment, the minimum time between two consecutive measurements on the same control channel is 5 ms and the maximum time between two consecutive measurements on the same control channel is 40 ms. In other embodiments, the different maximum and minimum times may be preferred. The averaging of the signal strength is typically done in dBm units.

In one embodiment, a system based on EIA/TIA "Cellular System Dual-Mode Mobile Station Base Station Compatibility Standard"IS-54-B, which is incorporated herein by reference, is modified to incorporate the features of the present invention as described in (PN3011).

This modified IS-54-B environment includes digital control channels (DCCH) which provide the mobile station with specific information which is used by the mobile station to sample the serving DCCH as well as neighboring control channels. This information is broadcast on a broadcast control channel (BCCH) by the DCCH. The DCCH provides the mobile station a list of the neighboring control channels which the mobile station enters on a neighbor table. The DCCH also provides the mobile station the sampling interval which represents the basic time interval between consecutive signal strength measurements of the short term signal strength value. The sampling interval is counted in "frames," i.e. a particular CCH must be sampled within a specified number of frames. Since frames have a fixed size and duration, a frame defines a unit of time (e.g. a TDMA frame=40 ms, a superframe=64 Oms) and is a convenient way to specify time in wireless systems.

In this embodiment, the mobile station measures the signal strength of the serving Digital Control Channel (DCCH) or a neighboring control channel each time its associated measurement interval lapses. As an example, assume the DCCH has provided the mobile station with information of sixteen neighboring control channels. Thus, the neighbor table contains 16 entries.

Whenever there is a change in either the sampling interval or the neighbor table, the mobile station computes the measurement interval for each entry in the neighbor table. In addition, the measurement interval (or sample interval) at which the short term signal strength of the serving DCCH is provided.

The mobile station keeps a running average (i.e. the long term average) of the last five signal strength measurements for each measured frequency (i.e. each control channel). Additionally, the mobile station keeps a running average of the serving CCH, if any, also comprised of the last five signal strength measurements. Thus, in this example, 17 averages are maintained, 16 for the neighboring channels and one for the serving channel. These values are used for control channel reselection as is described further below. The mobile station keeps a running average of the last two samples for the short term signal strength measurement for each of the 17 control channels.

Upon locking on a control channel, the mobile resets a flag indicating that valid signal strength measurement values are not available. After collecting 5 signal strength measurements for each entry in the neighbor table, the flag is set to show that valid long term signal strength measurements are available. In this embodiment, the short term signal strength measurements may be formed by averaging several adjacent samples.

Referring now to FIG. 5, the method of operation of an embodiment of the invention is shown in which the mobile station determines the need to reselect a control channel according to the long and short term average for the serving CCH. Assume for ease of explanation, that the mobile uses a single sample to represent the short term signal strength value and averages five samples to obtain the long term average. The mobile station determines in step 510, the adjacent control channels, the appropriate sample rate for the neighboring CCHs and the serving CCH, and appropriate threshold values. As previously indicated, these parameters may be provided to the mobile by the serving CCH. Alternately, any or all of the required parameters, including the threshold values and/or the sample rates may be predetermined. The method described in FIG. 5 is typically controlled by software stored in the mobile and implementation thereof is controlled by controller 320.

The mobile station samples the received signal strength for each potential CCH and the serving CCH, in step 520. For each sample taken at step 520, the long term average is recalculated (average of the last five received samples) and the short term average is replaced by the updated value in step 530 to maintain the long and short term values shown in FIG. 4 for each CCH (the potential CCHs and the serving CCH). Sampling step 520 and updating step 530 are performed for each CCH at the appropriate rate determined by the sampling interval.

At step 540, the mobile determines if the long term average of the serving CCH is below a predetermined threshold. If so, the mobile station determines in step 550 if the short term average is below a predetermined threshold. If either step 540 or 550 determines that the long or short term values are above the threshold, the system returns to step 520 to continue sampling.

Thus, the thresholds utilized in steps 540 and 550 for the long term average and the short term average may be the same value or may be different. In some environments in which this invention is practiced, it may be preferable to compare the long term and the short term average to separate thresholds. Utilizing separate thresholds may have advantages such as allowing the system to account for the trending contained in the long term average or to set up for expected trigger activities prior to an actual trigger occurring.

Finally, in step 560, if both the long term average and short term values of the serving CCH are below the predetermined threshold, the mobile determines that a trigger for CCH reselection exists and reselects a CCH utilizing the long and short term signal strength measurements maintained for the neighboring channels. Reselection of the CCH may involve not only the received signal strength measurements (received power), but may also be based on such criteria as path loss, duration of time factors for the signal measurements, and other criteria known to one of ordinary skill in the art. The neighboring control channel that best satisfies the criteria associated with the particular system is selected as the new CCH on which the mobile will tune.

Figure 6:
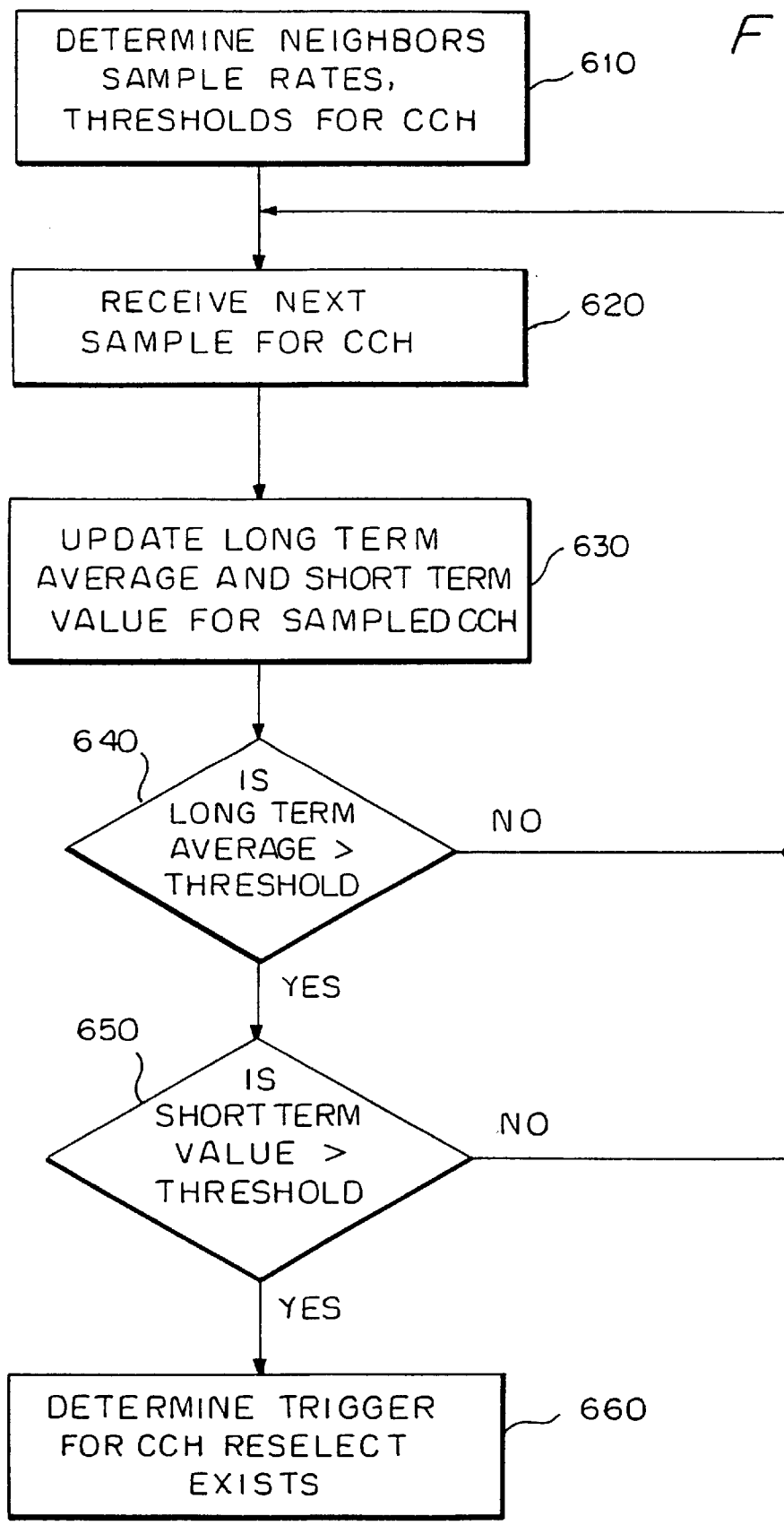
FIG. 6 shows a flow diagram of a second embodiment of the invention.

In another embodiment, the mobile checks the strength of the neighboring control channels to determine the need for a CCH reselect. If the signal received from a particular neighboring CCH exceeds a certain threshold value according the dual stage approach, that particular CCH is reselected as the serving CCH for the mobile. Referring to FIG. 6, the mobile determines the neighboring control channels, the sample rate for each of the control channels and the appropriate thresholds in step 610. As with the previous embodiment, any or all of these parameters may be supplied by the serving CCH or may be predetermined and stored in the mobile station. The mobile samples the signal strength in step 620. This step is repeated for each designated CCH at the appropriate sample rate. After receiving each sample, the mobile updates the long and short term averages in step 630 to maintain the long and short term average. In step 640, the mobile determines for the CCH whose long average and short term signal value was updated in step 630, if the long term average is greater than the threshold value. The mobile then checks to see if the short term value is also greater than the short term threshold value. Note that in some embodiments, it may be more efficient to check the short term value first and then check the long term average. The threshold values checked in steps 640 and 650 may be the same or may differ according to the needs of the particular system. If both the short term value and the long term average of a neighboring CCH is greater than the threshold value(s), then the mobile reselects this CCH as the serving CCH for the mobile. Of course, additional criteria may be considered in reselecting the CCH, such as signal path loss criteria, as discussed previously. If either the short term value or the long term average are less than their respective threshold values, the system returns to step 620 to continue sampling received signals.

The method described in FIG. 6 is typically controlled by software stored in the mobile and implementation thereof is controlled by controller 320.

Of course a combination of the embodiments shown in FIGS. 5 and 6 may be utilized to determine when to reselect a control channel. Specifically, the trigger decision may be based both on the long term average and short term value of the serving CCH falling below a threshold value and/or on a long term average and short term value of the received signal strength measurements of one or more of the neighboring control channels exceeding a threshold value.

For both embodiments shown in FIGS. 5 and 6, the averaging approach improves the decision process by removing the effects of short term fades in the signal that may cause premature action triggers. This initial trigger is then qualified by examining the short term current value of the signal. The actual action trigger is only realized when both short term and long term values indicate that the action threshold has been exceeded. This qualification eliminates the occurrence of false triggers exhibited by the historical bias that may exist as discussed above and shown in the graphic examples.

Again, the methods and apparatus described above apply equally to measuring the signal strength of the serving traffic channel and neighboring reference channels, a reference channel being a traffic, control or beacon (or pilot) channel. When the signal strength of the serving traffic channel falls below a predetermined threshold, according to the dual stage approach, a traffic channel signal strength trigger exists to switch the call to a traffic channel in a different coverage area. Similarly if neighboring reference channels rise above a specified threshold, a traffic channel switch may be indicated.

Figure 7:
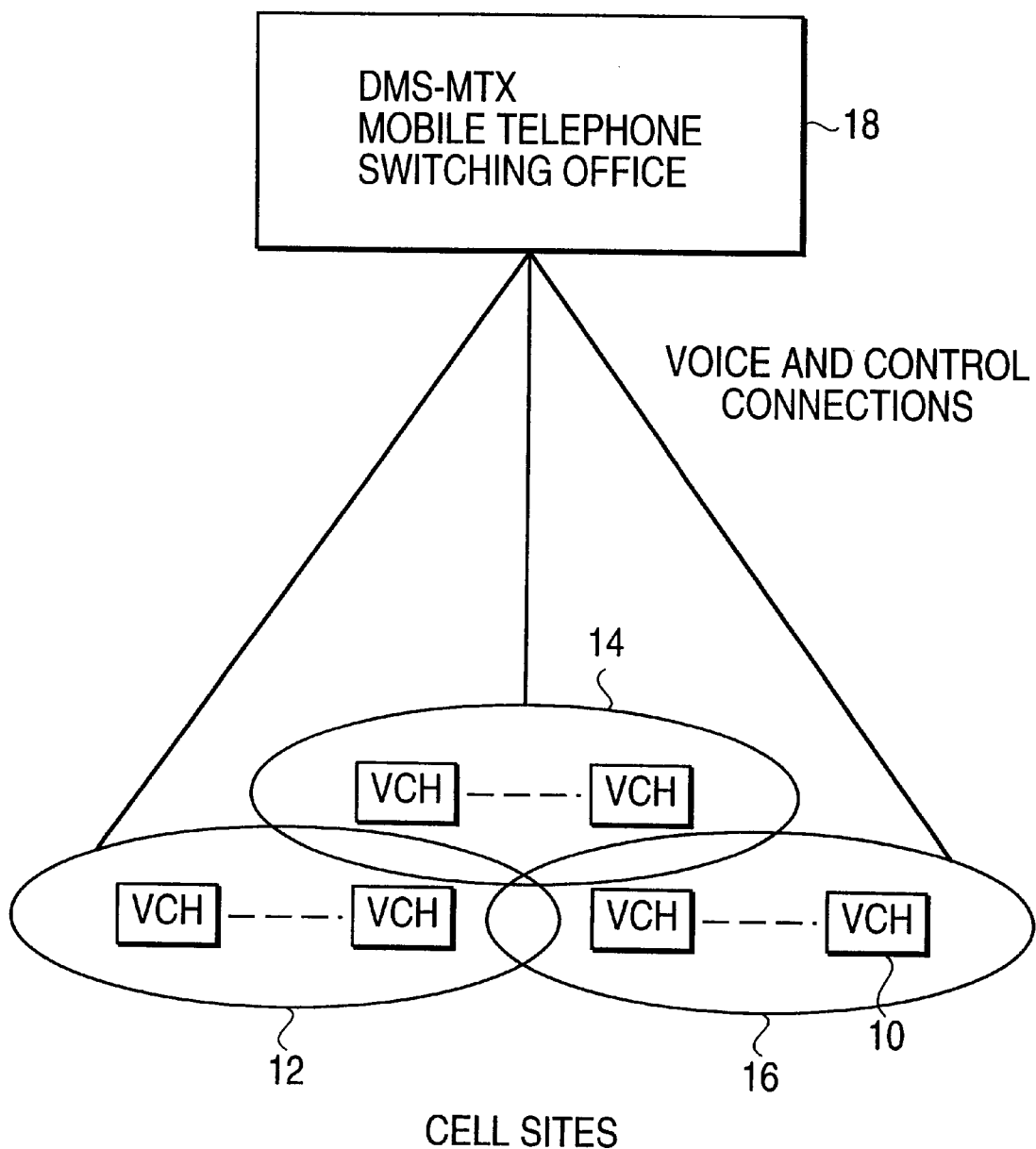
FIG. 7 shows an overview of the cellular system with a cell controller and a number of cell sites.

FIG. 7 shows the overall environment in which the handoff trigger, according to the invention is determined. Voice channels 10 in cell sites 12, 14 and 16 are connected to the Digital Multiplex Switch-Mobile Telephone Exchange (DMS-MTX) (also known as the Mobile Telephone Switching Office (MTSO)) 18. The DMS-MTX acts as a cell controller for a number of cells. The Voice Channels (VCH) are contained in base stations. The handoff trigger determines when a mobile phone call on a particular voice channel in one cell site should be handed off to a voice channel in another cell site. The base stations can also be configured as Locate Receivers (LCR) devices to provide the cell controller 18 with measured signal strength values in adjacent cells upon command of the cell controller in preparation for the handoff.

Figure 8:
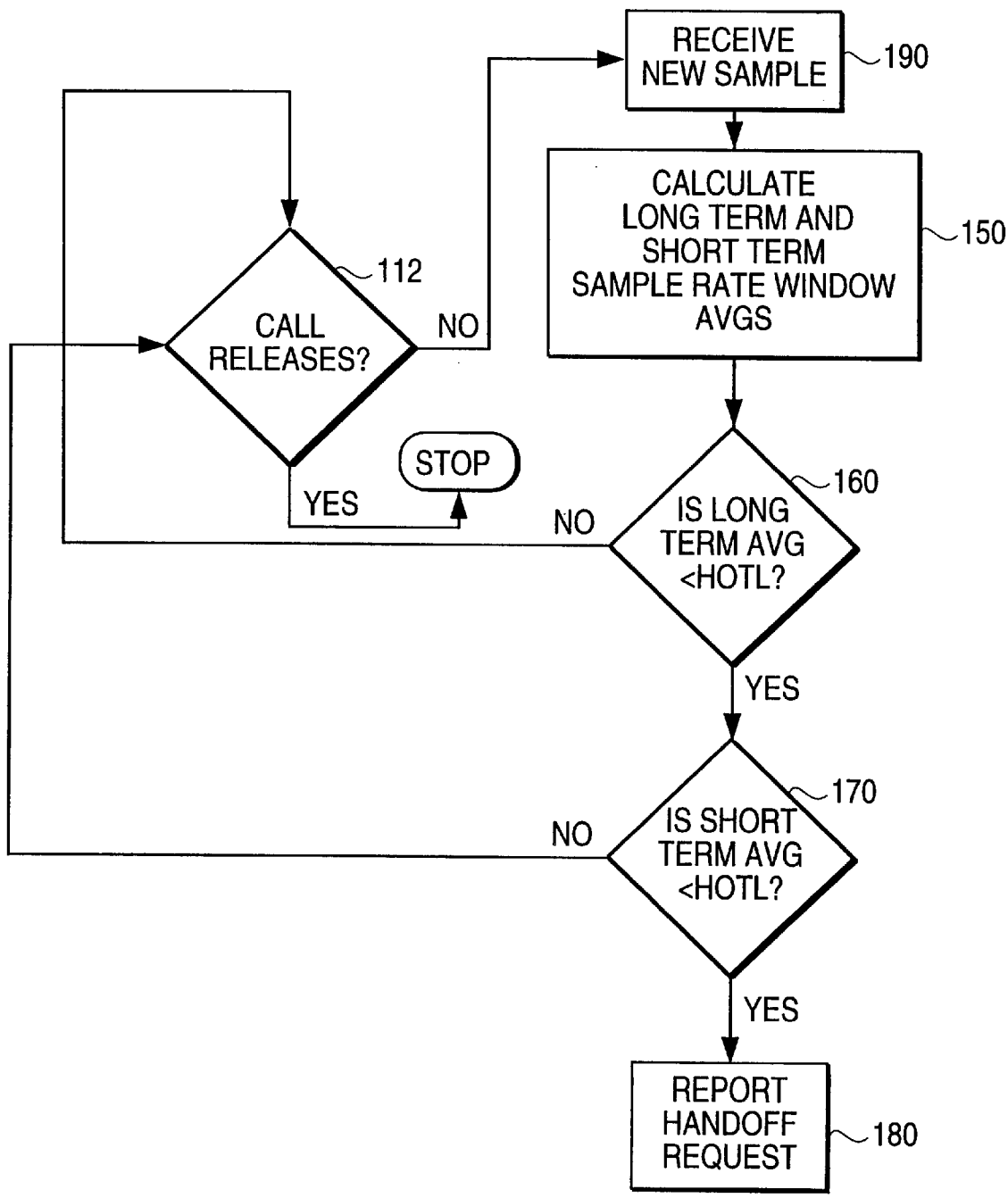
FIG. 8 shows an overview of a method according to a third embodiment of the invention.
Figure 9:
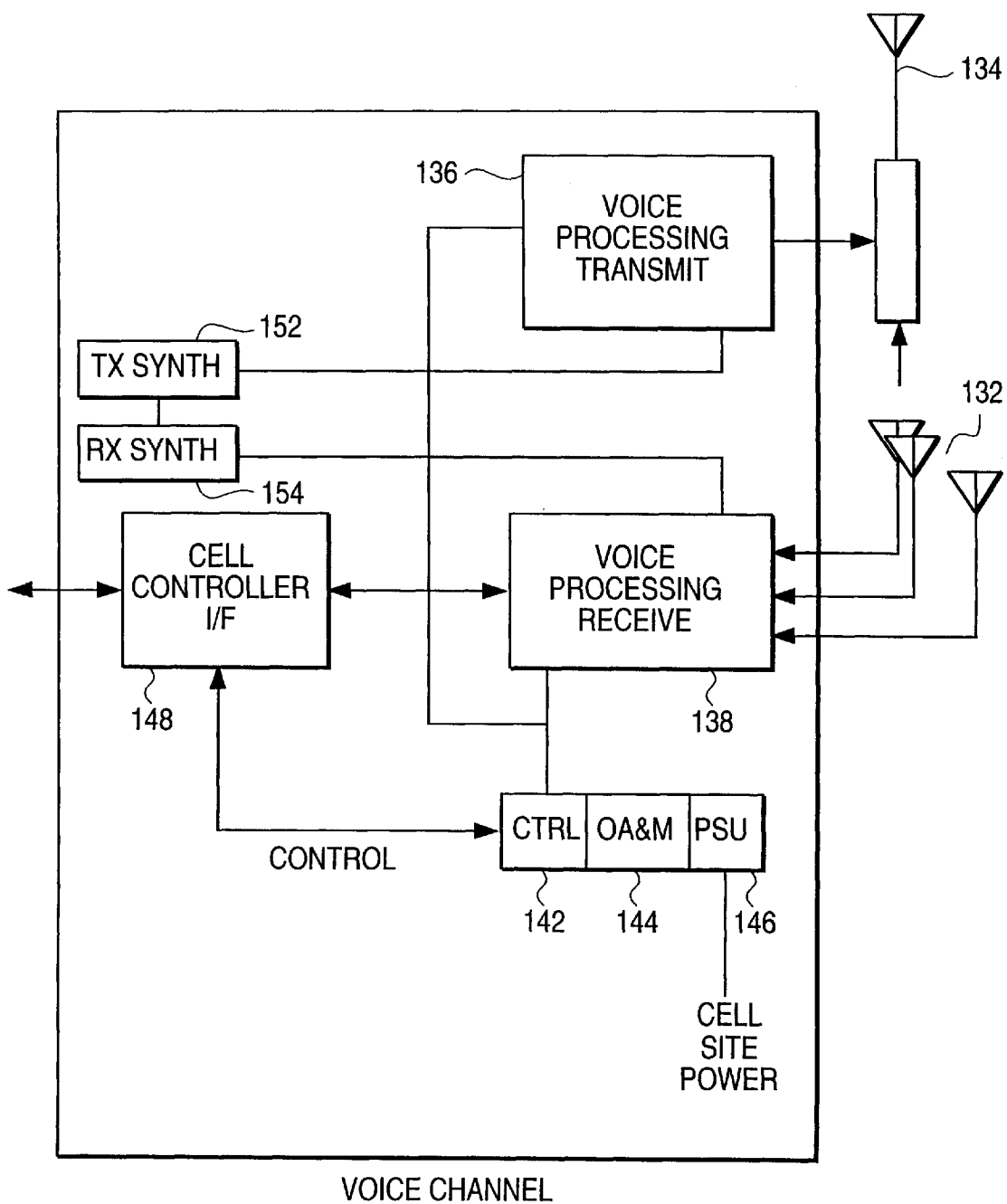
FIG. 9 shows a block diagram of a Voice Channel in a base station.

A simplified overview of the method of the present invention is presented in FIG. 8. The Voice Channel (VCH) in the base station will use a long term RSSI average to determine when a handoff condition is to be checked. The long term RSSI average is computed by averaging samples representing the strength of the received signal, contained in a particular window of time, e.g. several seconds. The short term average is a the average over a smaller window of time, e.g typically tens to hundreds of milliseconds. The long and short term averages are calculated in step 150. If the entire sample rate window average (i.e. the long term average, also known as the long term sample rate (LTSR) average) is determined to be less than the handoff threshold (HOTL) in step 160, then the short term average (also known as the Second Stage Sample Rate (SSSR) average) is checked in step 170. If the short term average is also less than HOTL, then a handoff request is reported in step 180. If short term average is not less than HOTL, and the call does not release in step 192, new samples are received, new averages calculated and checked against HOTL. This is continued until both the short and long term averages are less than HOTL or the call releases. This can alternatively be described in a further simplified form as:

If LTSR buffer is full
   then for every sample, the LTSR and SSSR averages are recalculated;
   if LTSR<HOTL & SSSR<HOTL
      then send handoff request
   else do nothing
endif FIG. 9 shows a block diagram of the Voice Channel on which the method of the present invention is practiced. The VCH includes receive and transmit antennas 132 and 134, a voice processing transmit block 136 containing D/A converters and modulators, a voice processing receive block including A/D converters and demodulators. TX synth block 152 and RX synth block 154 provide appropriate frequencies for modulating and demodulating the transmitted and received signals. Block 144 provides operation, administration and maintenance (OA&M) functions. Block 146 is the power supply unit connecting to the cell site power. Controller block 142 provides control functions for the voice channel, including the necessary processing circuitry, e.g. a microprocessor, to determine long and short term averages, as well as sufficient memory (e.g. RAM) to maintain the long and short term buffers. Of course, other voice channel control functions may be performed by the processor. The controller block 142 receives the RSSI samples through the receive channel and stores and processes the samples as described herein. Finally, the controller block 142 communicates with the cell controller through interface 148, sending handoff requests and receiving voice channel parameters and commands.

Figure 10:
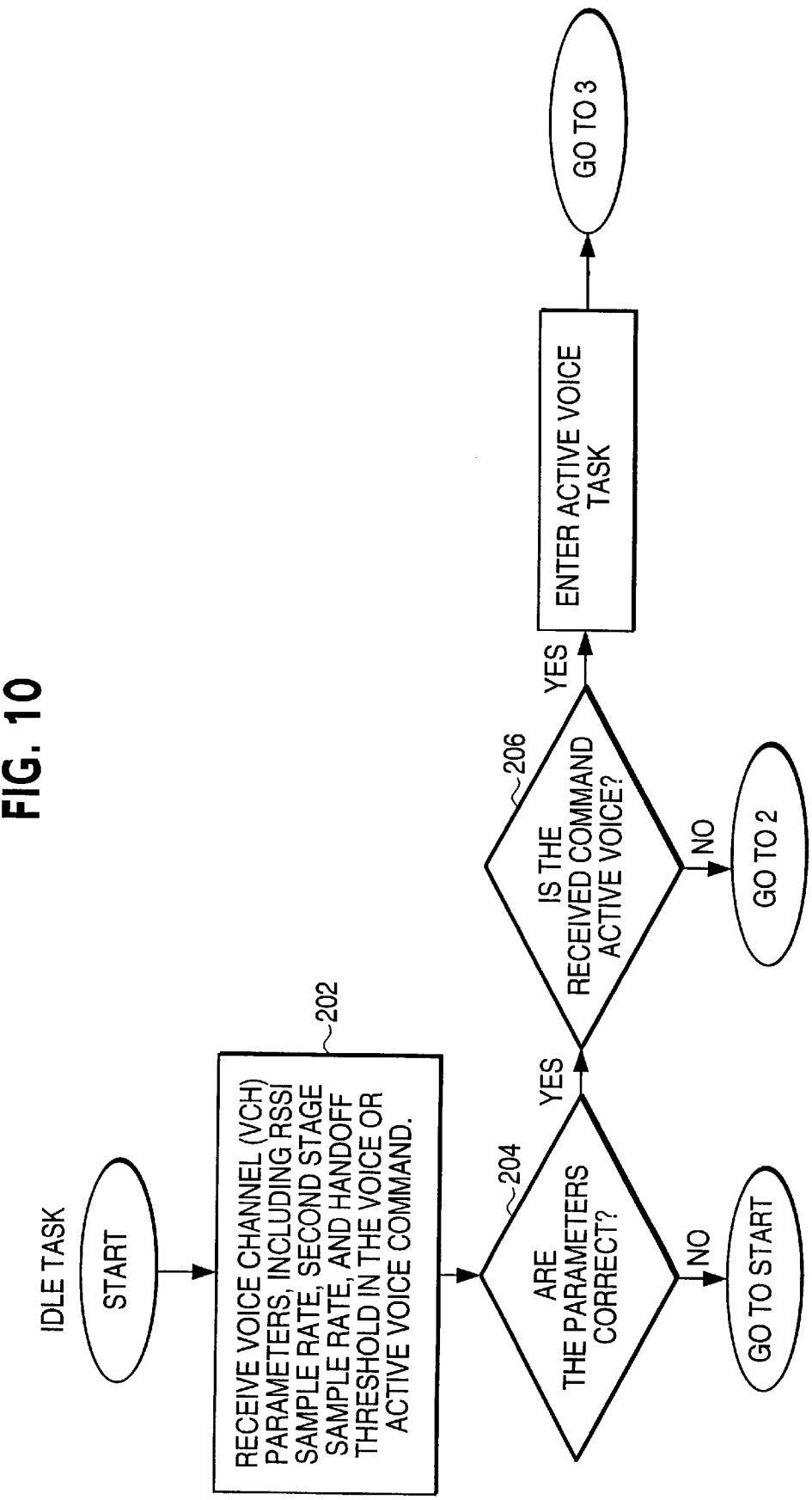
FIG. 10 shows the initial steps taken by a base station upon receiving a command.

The Dual Stage RSSI handoff approach of a base station is shown in FIG. 10. The DMS-MTX controller transmits the Voice Channel Parameters, including the RSSI Sample Rate (also known as the long term sample rate), the Second Stage Sample Rate (SSSR) (also known as the short term sample rate) and the handoff threshold to the base station in 202.

The Voice Channel parameters can vary among systems and from cell to cell. The RSSI Sample Rate gives the long term averaging time, i.e. the width of the window. Typical values of the window are in the range of 2.5 to 3.5 seconds. Wider ranges for the long term averaging widow are also possible. For instance, in one particular configuration, the range can vary from 0.32 seconds to 5.12 seconds. Optimum ranges will vary according to the system (i.e. the specific hardware and software) and the environment in which the system is utilized.

The short term sample rate, i.e. the SSSR or short term averaging time, should be correlated as closely as possible to the sample rate (i.e. averaging time) of the locate receivers (LCRs) in adjacent cells. The correlation with the LCRs sample rate means that the signal strength value provided as the mobile station's signal strength for comparisons to the signal strength measured on the adjacent cells at handoff time will provide the best comparison with the measurements made on the adjacent cells. Optimum performance of the second stage sample rates is therefore a function of the LCR sample rates. The SSSR should optimally be within 100 ms of the averaging time for the LCRs. By way of example, in one particular embodiment, the SSSR can range from 20–300 ms with 120 ms being preferred, based on characteristics of the system and environment.

The handoff threshold is a configurable value with typical ranges of between −75 dBm and −90 dBm. Other Voice Channel parameter values are of course possible based on the particular environment in which the system is designed to operate. However, the SSSR should always be shorter than the LTSR.

The SAMPLE RATE field in the VOICE or ACTIVE VOICE commands controls the Long Term Sample Rate (LTSR). The SSSR field controls the Second Stage or short term sample rate. By way of example and not limitation, the VOICE and ACTIVE VOICE commands may define the (SSSR) in a four bit field. If the granularity of the sample rate is in 20 ms samples, a typical value, the range of the second stage averaging could be specified from 20 to 300 ms utilizing these four bits, with a 0 meaning disabled. Other granularities for the sample rate may be used according to system requirements.

Four bits may also be used to define the Long Term Sample Rate (LTSR). If, the granularity of the LTSR is blocks of 16 samples at 20 ms, then more than 5 seconds can be specified as the window length using the four bit field.

Figure 11:
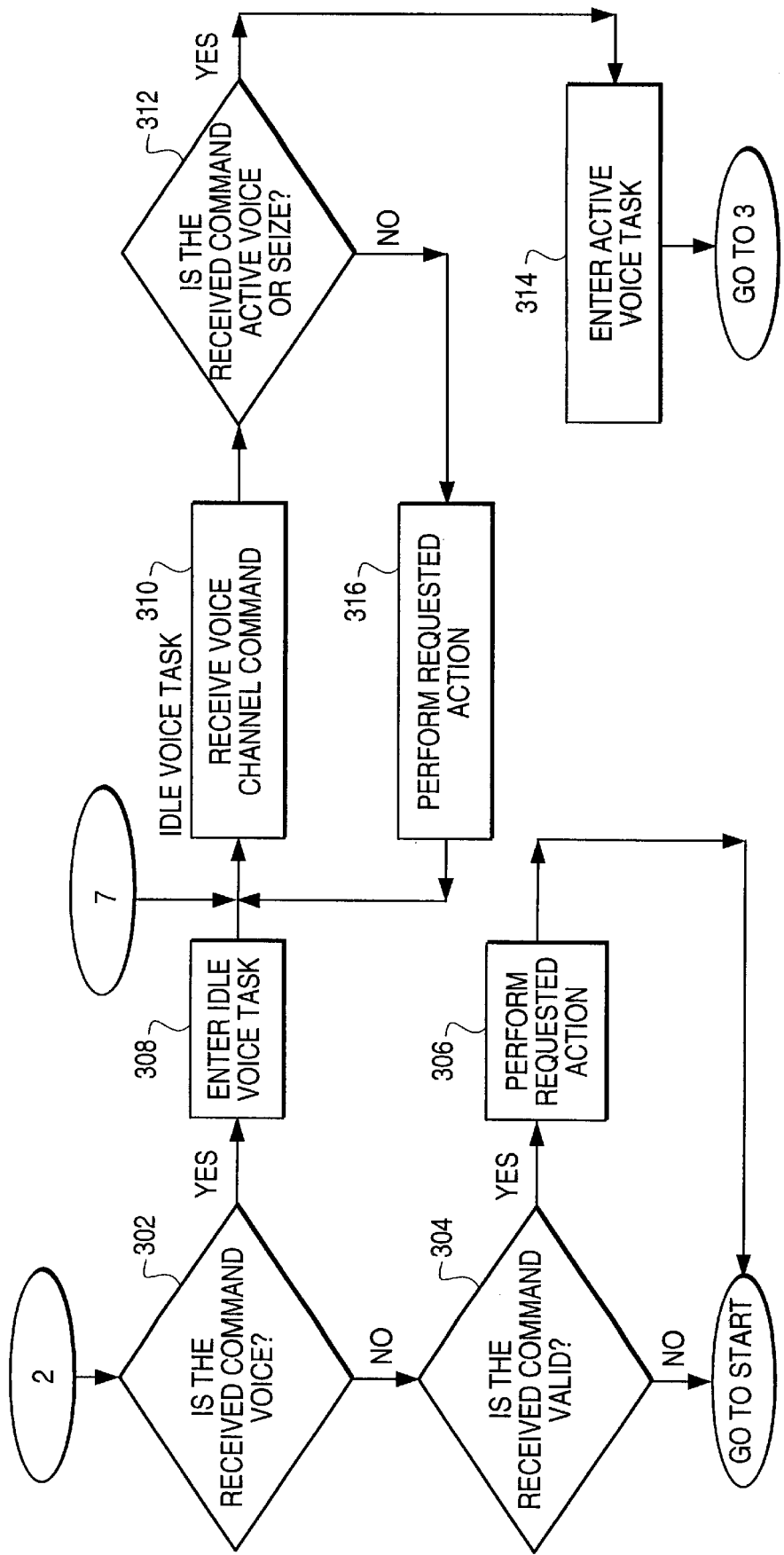
FIG. 11 shows the base station response for non ACTIVE VOICE commands.

The base station checks the received parameters for correctness in step 204, by screening each field both for conformance to known ranges and completeness of the parameters. Appropriate error codes are returned to the controller if the voice channel detects a problem with a parameter. The received command is checked in step 206 to see if it is an ACTIVE VOICE command. Referring now to FIG. 11, if the received command is not an ACTIVE VOICE command, the command is checked in step 302 to see if the received command is VOICE. If not, the validity of the command is determined in step 304, and following performance of the requested action in step 306, the base station returns to START. If the received command is VOICE, the IDLE VOICE TASK is entered in step 308 and voice channel commands are received in step 310. Upon receipt of either ACTIVE VOICE or SEIZE command in step 312, ACTIVE VOICE task is entered in step 314. Otherwise the base station performs the requested action in step 316.

The SEIZE command is the principal command used to transition a voice channel from the idle to the active state. The voice channel uses the operational parameters defined in the VOICE command. The SEIZE command also contains some initial information relating to the call that is to be set up on the voice channel. The ACTIVE VOICE command is essentially a combined VOICE and SEIZE command. The voice channel transitions from the idle to active task, but uses the operational parameters from the ACTIVE VOICE command. This also contains the initial information relating to the call to be set up. The ACTIVE VOICE command is not generally used, but it is available and may find uses in certain implementations.

Figure 12:
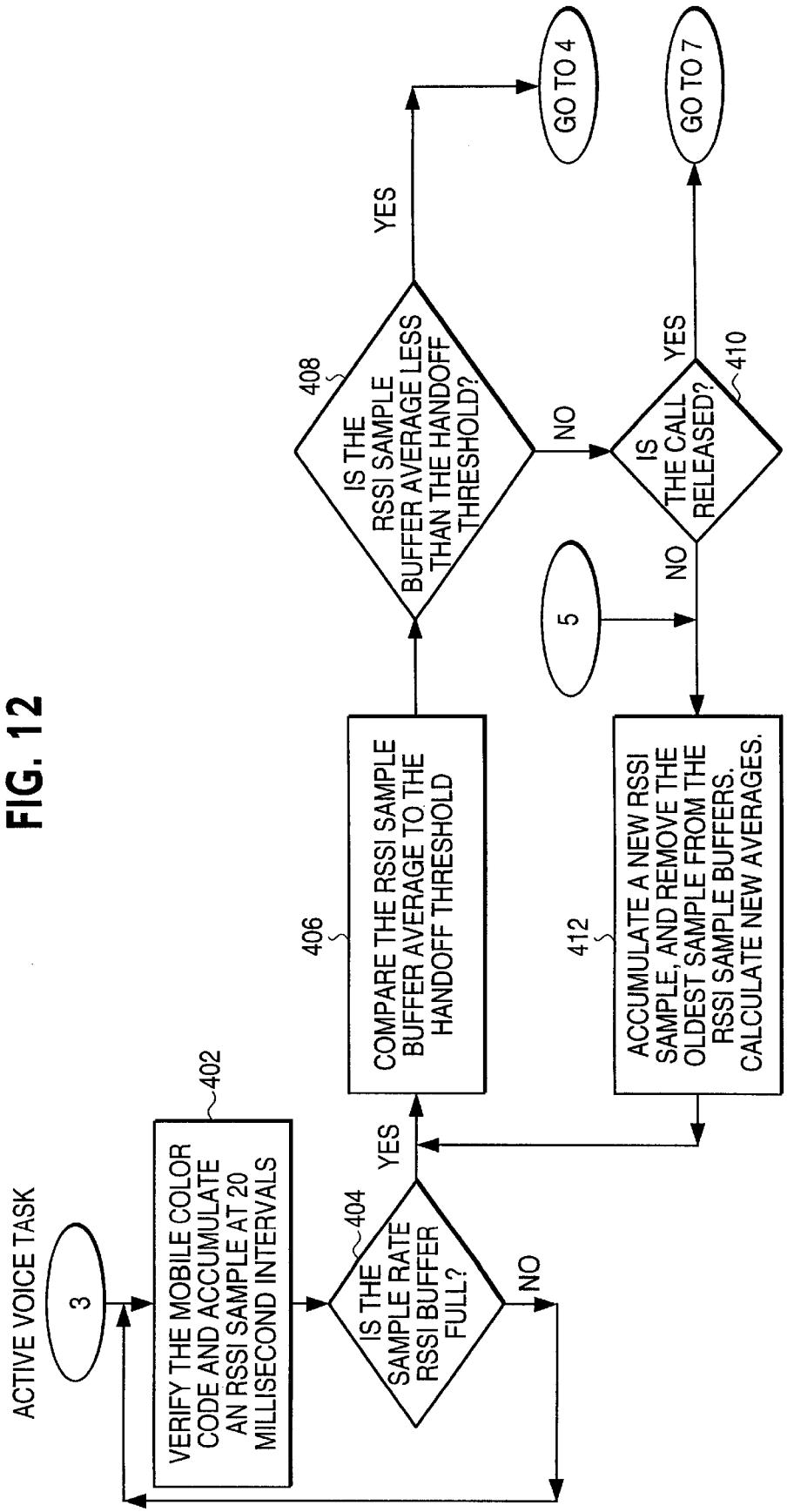
FIG. 12 shows the base station response for ACTIVE VOICE commands.

Referring to FIG. 12, in the ACTIVE VOICE TASK, the mobile color code is verified. The mobile color code (Supervisory Auditory Tone (SAT) in analog calls, or the Digital Voice Color Code (DVCC) in digital calls) is a method used to identify that the correct mobile is on the correct voice channel as is known in the art. These are used to discriminate between voice channels that reuse the same radio frequency in the cellular system.

Additionally, in the ACTIVE VOICE TASK, an RSSI sample is accumulated at typical intervals of tens of milliseconds. RSSI levels are represented in the preferred embodiment as eight bit numbers (from 0 to 255), which correspond to signal strength levels of −130 dBm to −30 dBm. The RSSI buffer stores the RSSI sample values. The length of the RSSI buffer is determined by the sample rate and the sample interval, i.e. the length of the window and the number of samples per window. Thus, by way of example, an RSSI Sample Rate (also called the Long Term Sample Rate (LTSR)) of 3.2 seconds at 20 ms intervals, results in an RSSI buffer length of 160 eight bit samples. By way of example, an SSSR sample size of 5 samples, results from an SSSR window length of 100 ms at 20 ms intervals. Other buffer lengths sizes may also be used within the scope of the invention.

If the RSSI buffer is not full, as determined in step 404, the base station accumulates additional RSSI samples, as shown in step 402. If the RSSI sample buffer is full, the buffer average is compared to the handoff threshold in step 406. New averages are computed for each received sample, once the buffers are full. If the long term averaged value (RSSI sample buffer average) is greater than the handoff threshold, the base station determines whether the call has been released in step 410. If so, then the base station returns to the IDLE VOICE TASK. Note that the release can be processed at a number of different places in the flow of the system according to the invention. If the call is not released, then the base station accumulates a new RSSI sample and removes the oldest sample from the RSSI sample buffer. The base station then calculates new averages for both the SSSR buffer average and the RSSI buffer average in step 412.

Figure 13:
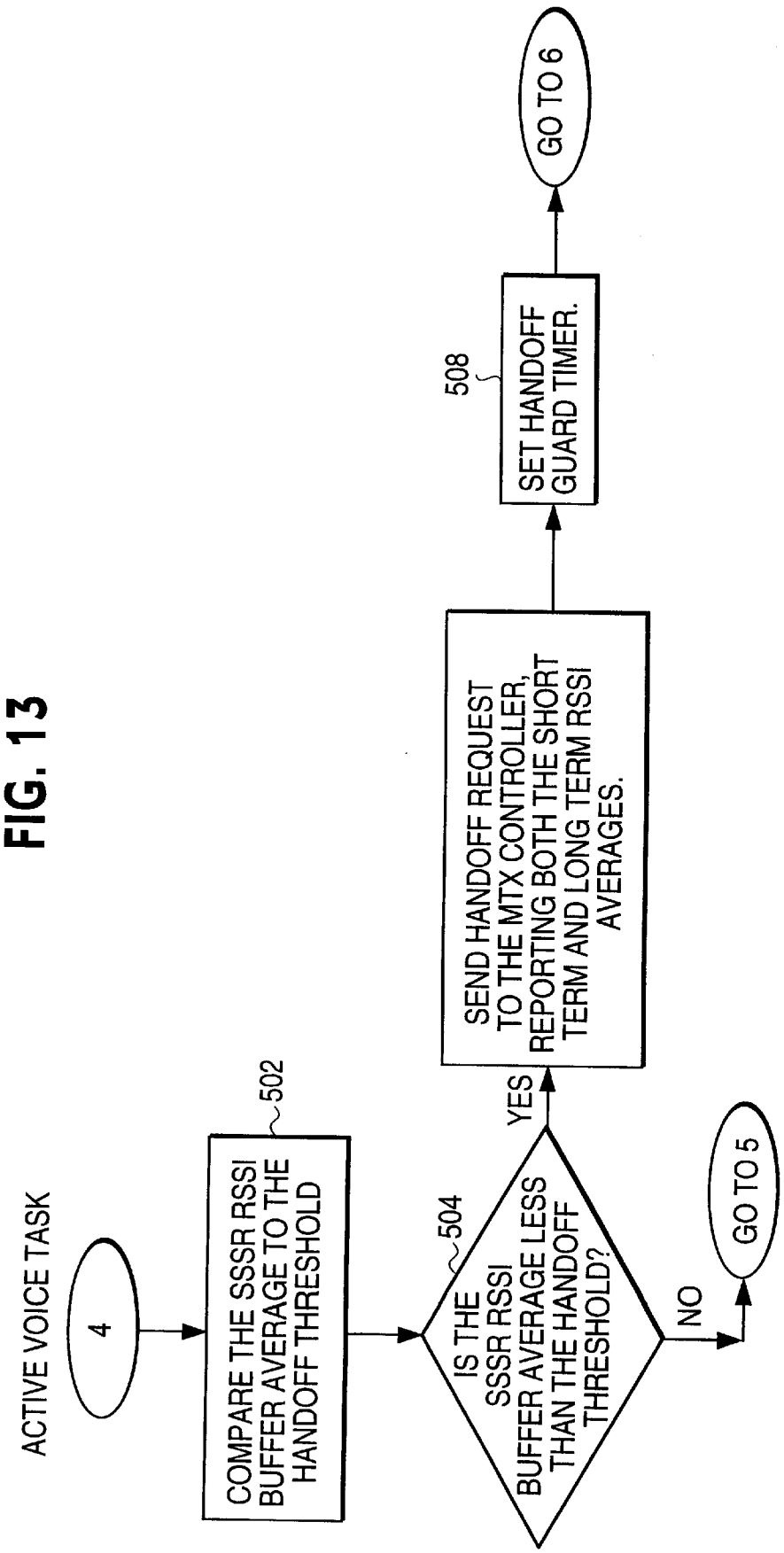
FIG. 13 shows additional base station response steps for ACTIVE VOICE tasks.

If the RSSI Sample buffer average is less than the handoff threshold in step 408, then the SSSR RSSI buffer average is compared to the handoff threshold in step 502, as shown in FIG. 13. If the SSSR RSSI buffer average is greater than the handoff threshold, the second condition for a handoff trigger has not been met and new RSSI samples are accumulated in step 412.

If the SSSR RSSI buffer average is less than the handoff threshold in step 504, then the conditions for a handoff trigger have been met, i.e. both the long term average and the short term signal strength values are below the threshold. The handoff request is sent to the DMS-MTX controller, reporting both the short term and long term RSSI averages in step 506 and a handoff guard timer is set in step 508. Timer values will vary with the particular system being implemented with typical values ranging between 10 and 15 seconds, although other values may be used.

Figure 14:
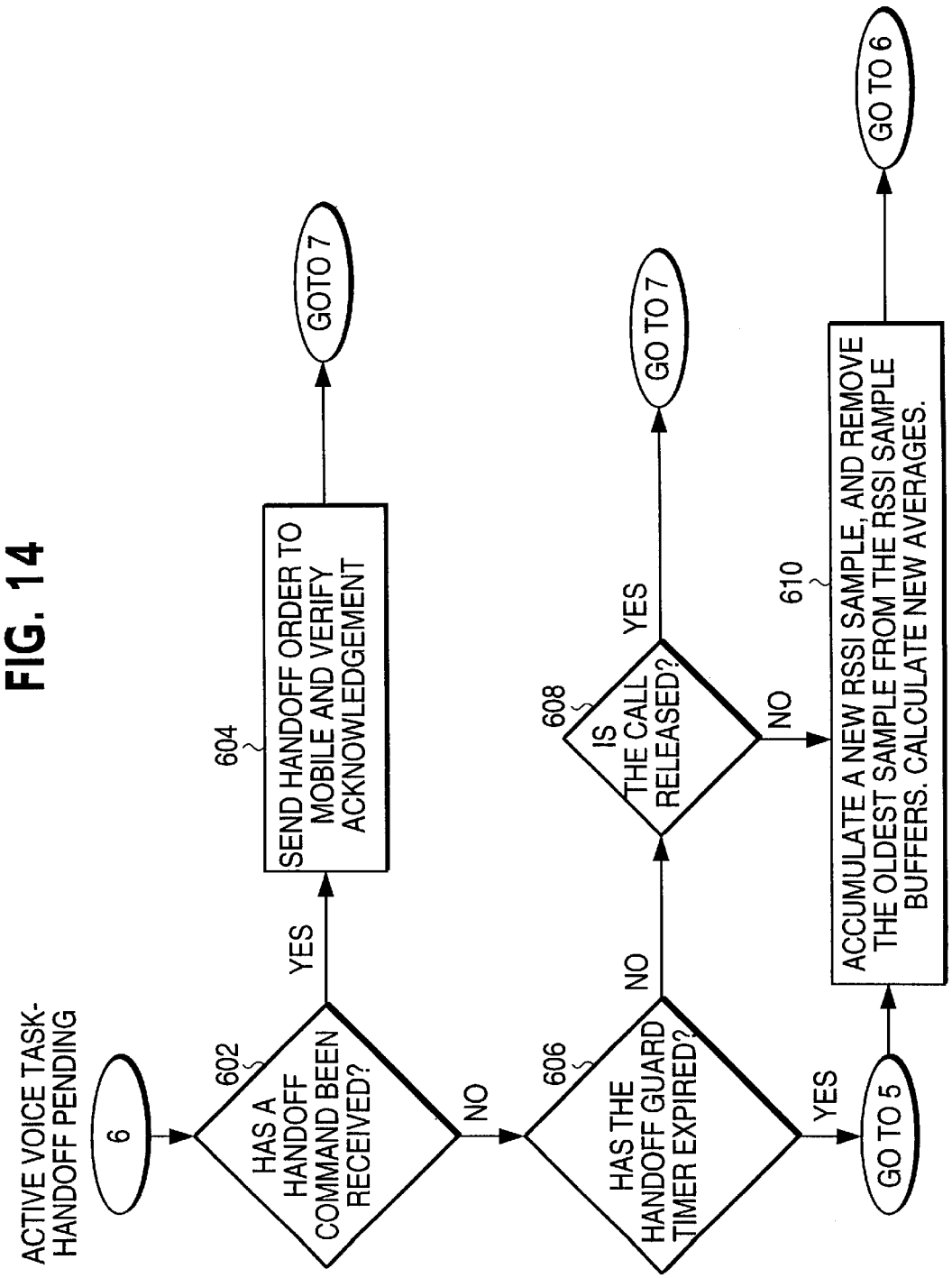
FIG. 14 shows the base station responses with handoff pending.

Referring to FIG. 14, the base station enters a handoff pending state awaiting a handoff command from the DMS-MTX Controller in step 602. If such a command is received, the base station sends the handoff order to the mobile station in step 604 and returns to the IDLE VOICE TASK. If the handoff guard timer expires in step 606, then the base station returns to step 412 to accumulate a new RSSI sample and update the averages. If the handoff guard timer has not expired, the base station checks whether the call has been released in step 608. If the call is not released (and the handoff guard timer has not expired) a new RSSI sample is accumulated and new averages are calculated in step 610, and the controller in the base station returns to step 602. Otherwise, if the call is released, the base station returns to the IDLE VOICE TASK.

Figure 15A:
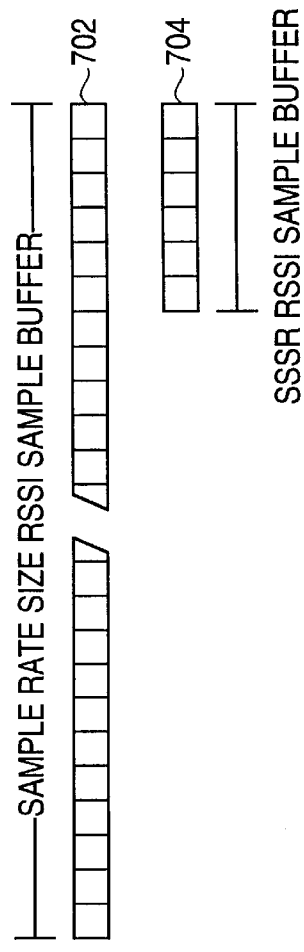
FIGS. 15a and 15b show the long term and short term RSSI sample buffers.
Figure 15B:
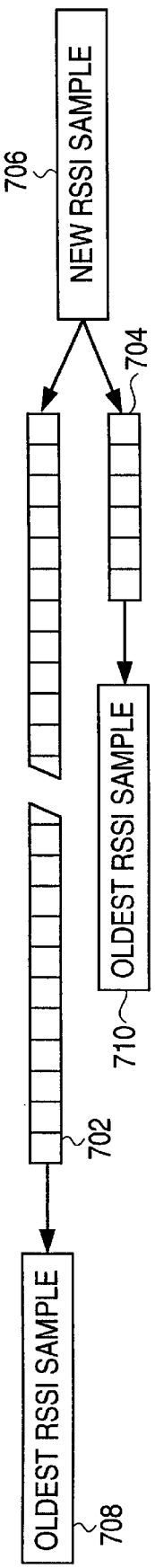
Figure 16:
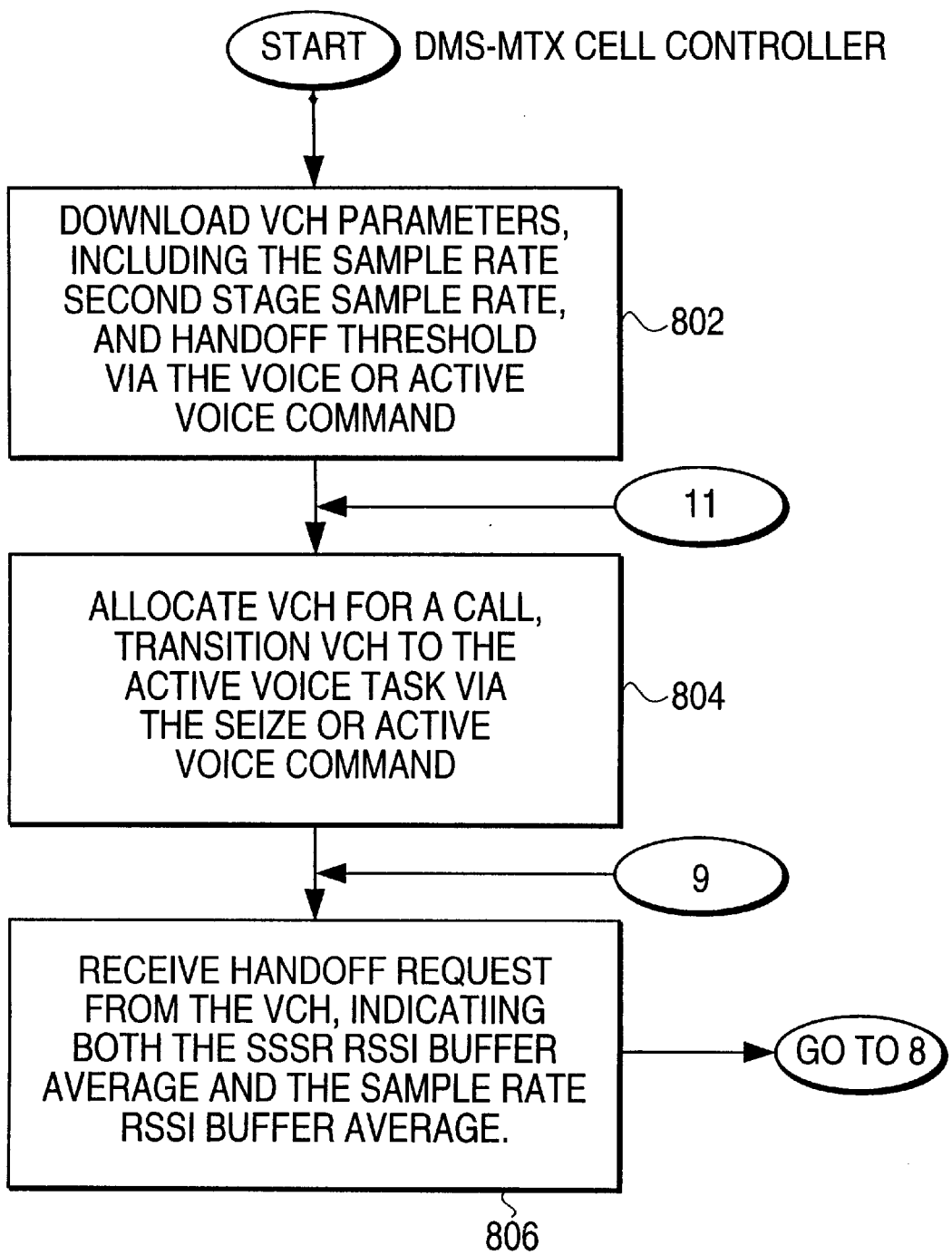

The RSSI Sample Rate Buffer (long term buffer) 702 and the SSSR RSSI Sample Buffer (short term) 704 are shown in FIG. 15a. As a new RSSI sample 706 is measured, it is entered into both the RSSI Sample Buffer 702 and the SSSR Sample Buffer 704. If the Buffer is full, then the oldest samples 708 and 710 are removed from their respective buffers and a new average is calculated for each buffer. The SSSR RSSI sample buffer contains the most recent samples of the RSSI Sample Rate buffer. The RSSI Sample Rate Buffer and the SSSR RSSI Sample Buffer may be implemented in conventional RAM.

The handoff request message includes both the short term SSSR average and the long term RSSI average. An RSSI Level message is one that the DMS-MTX controller can solicit from the voice channel, in which the base station reports the current RSSI averages. The RSSI Level message also contains both the short term SSSR average and the long term RSSI average.

Figure 17:
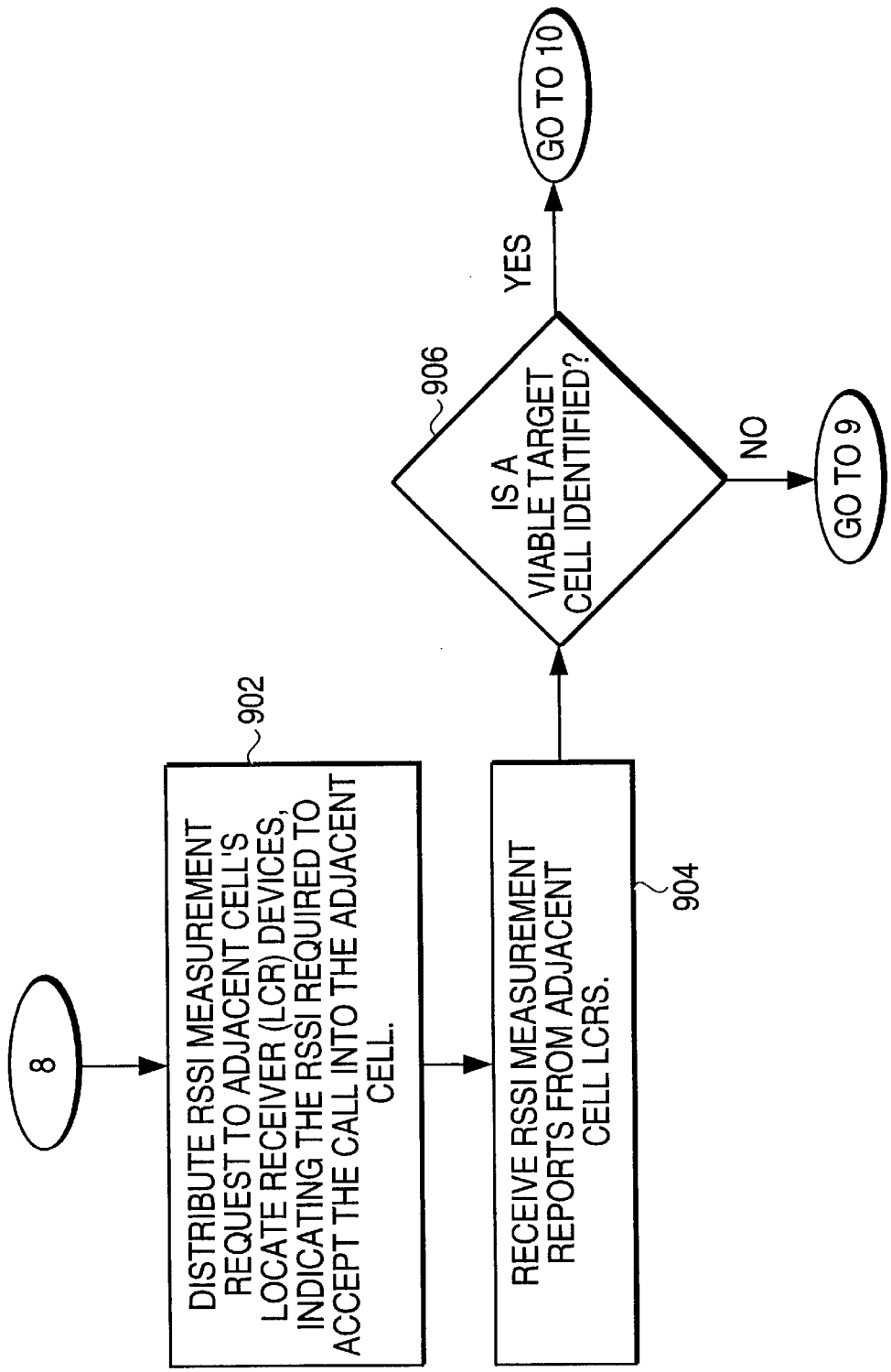

The method as seen from the DMS-MTX cell controller is shown in FIG. 17. The DMS-MTX controller can control multiple cells, each with multiple base stations. The DMS-MTX controller downloads the Sample Rate (i.e. the LTSR), Second Stage Sample Rate, and the handoff threshold via the VOICE or ACTIVE VOICE command in step 802. A Voice Channel (VCH) is allocated for a call and the VCH transitions to the ACTIVE VOICE TASK via the SEIZE or ACTIVE VOICE command in step 804. In step 806 the handoff request is received from the VCH of the base station which includes both the SSSR RSSI buffer average and the SAMPLE RATE RSSI buffer average.

Referring to FIG. 19, the DMS-MTX Cell Controller distributes an RSSI Measurement request to adjacent cells' Locate Receiver (LCR) devices indicating the RSSI required to accept the call into the adjacent cell, as shown in step 902. The required RSSI is based on the SSSR RSSI buffer average plus a hysteresis. In step 904, RSSI measurement reports are received from adjacent cells' LCRs. If a viable target cell is not identified in step 906, then the DMS-MTX Cell Controller returns to step 806 awaiting a handoff request.

Referring to FIG. 18, if a viable target cell is identified, then a VCH is allocated for a handoff and the new VCH is transitioned to ACTIVE VOICE TASK via either the SEIZE or ACTIVE VOICE command in step 1002. The handoff command is sent in step 1004 to the serving VCH (i.e. the voice channel currently handling the call that generated the handoff request) indicating the handoff target VCH on the adjacent cell.

If the handoff is determined to be successful in step 1006, the original VCH transitions to IDLE VOICE TASK in step 1008 and the DMS-MTX Cell Controller returns to step 804.

While preferred embodiments of the invention have been described, modifications of the described embodiments may become apparent to those of ordinary skill in the art, following the teachings of the invention, without departing from the scope of the present invention as set forth in the appended claims.

What is claimed is:

1. A method, in a wireless communications system, of evaluating a received signal, comprising the steps of:
   obtaining a long term average value and a short term value indicating the strength of a received signal;
   determining a characteristic of the received signal according to a separate consideration of both the long term average value and the short term value;
   determining that a signal strength based trigger condition exists when both the long term average value and the short term average value exceed a predetermined threshold; and
   if the short term average value is not greater than said predetermined threshold, continuing checking said short term average value until one of both said short and long term average values is greater than said predetermined threshold.

2. The method of claim 1 further comprising the steps of:
   maintaining a list of control channels that are adjacent to a current control channel;
   maintaining a long term average and short term value for each control channel on the table; and
   sampling each control channel at a predetermined interval to determine a received signal strength.

3. The method of claim 1 further comprising the steps of:
   sampling a serving control channel at a predetermined rate to determine the received signal strength; and
   maintaining a long term and short term average of the received signal strength for a serving control channel.

4. The method as recited in claim 1 further comprising the step of determining a traffic channel signal strength based reselect trigger condition exists when both the long term average value and the short term value of a serving traffic channel are below a pre determined threshold value.

5. The method as recited in claim 1 further comprising the step of determining a traffic channel signal strength based reselect trigger condition exists when both the long term average value and the short term value of a neighboring reference channel are above a predetermined threshold value.

6. The method of claim 1 further comprising the steps of:
   maintaining a list of reference channels that are adjacent to a current traffic channel;
   maintaining a long term average and short term value for each reference channel on the table; and
   sampling each reference channel at a predetermined interval to determine a received signal strength.

7. A method of correctly determining in a wireless unit in a wireless system, when a wireless unit should reselect a control channel, the method comprising the steps of:
   comparing a first signal value indicative of a long term averaged signal strength of a received signal to a predetermined first threshold value;
   comparing a second signal value indicative of a short term value of the received signal strength to a predetermined second threshold value if the first signal value is below the first threshold value;
   determining that a signal strength based reselect condition exists if both the first and second signal values are below the first and second threshold values, respectively; and
   if the second signal value is not less than said second threshold value, continuing checking said second signal value until one of both said first and second signal values are less than said first and second threshold values, respectively.

8. The method as recited in claim 7 wherein said first and second threshold values are equal.

9. The method as recited in claim 7 wherein said first and second threshold values are different.

10. The method of claim 7 wherein the long term average is comprised of an average of a plurality of the short term values.

11. A method of correctly determining in a mobile unit in a wireless system, when a mobile unit should reselect a control channel, the method comprising the steps of:
   comparing a first signal value indicative of a short term value of a received signal strength to a predetermined first threshold value;
   comparing a second signal value indicative of a long term average value of the received signal strength to a predetermined second threshold value if the first signal value is below the first threshold value;

determining that a signal strength based reselect condition exists if both the first and second signal values are below the first and second threshold values, respectively, and if the first signal value is not less than said first threshold value, continuing checking said first signal value until one of both said first and second signal values are less than said first and second threshold values, respectively.

12. A mobile station in a mobile communications system, comprising:

means for determining the strength of a received signal;

a memory containing a long term average value and a short term value indicating the strength of the received signal;

means for determining that a trigger condition is present when both the long term average value and the short term value are below a predetermined threshold; and means for continuing checking said short term value if said trigger condition is not met until one of both said short term value and long term average value is less than said predetermined threshold.

13. An apparatus for correctly determining in a wireless unit in a wireless system, when a wireless unit should reselect a control channel, the apparatus comprising:

an antenna receiving a transmitted signal;

a receiver connected to the antenna, the receiver providing a signal indicative of a signal strength of the received signal;

a memory storing a predetermined threshold value;

a processor connected to receive the signal from the receiver indicative of the signal strength of the received signal, the received signal being sampled at predetermined intervals of time, the processor being configured to determine a first signal value, the first signal value being determined from a plurality of samples of the strength of the received signal and being indicative of a long term averaged signal strength of a received signal, the processor further being configured to determine a second signal value indicative of a short term value of the received signal, the short term value being comprised of at least the most recent sample of the strength of the received signal, the processor further being configured to store the first and second signal values in the memory, the processor further being configured to compare the first and second signal values to the predetermined threshold value, the processor having an output indicating when both the first and second signal values exceed the threshold value, thereby indicating that a signal strength based reselect condition exists; and means for continuing checking said second signal value if said reselect condition is not met until one of both said first and second signal values is greater than said predetermined threshold.

14. A method of determining, in a cellular system, a time for handing off a phone call on a mobile station on a particular voice channel in one cell site to a voice channel in another cell site, the method comprising the steps of:

comparing a first signal value indicative of a long term averaged signal strength of a received signal from said mobile station, to a predetermined threshold value;

comparing a second signal value indicative of a short term value of said received signal strength to said threshold value if said first signal value is below said threshold value;

determining that a handoff condition exists if and only if both said first and second signal values are below said threshold;

if the handoff condition is not met, continuing checking said second signal value until one of both said first and second signal values are less than said threshold value; and initiating handoff of said call to said voice channel in another cell site when said handoff condition is met.

15. The method of claim 14 wherein a time period over which said first signal value is averaged is longer than a time period over which said second signal is averaged.

16. The method of claim 14 wherein a time period over which said second signal value is averaged is correlated to a time period over which a signal strength value is measured by locate/receive devices of adjacent cells.

17. A method of determining, in a cellular system, a time for handing off a phone call on a mobile station on a particular voice channel in one cell site to a voice channel in another cell site, the method comprising the steps of:

(a) determining if a long term sample rate window average of a received signal strength indicator (RSSI) is less than a handoff threshold;

(b) if said long term sample rate window average is less than said handoff threshold, determining if a short term average of said RSSI is less than said handoff threshold;

(c) if both said long term sample rate window average and said short term average is less than said handoff threshold, sending a handoff request to a controller; and (d) if said short term average is not less than said handoff threshold, continuing checking with every sample taken until one of both said short and long term averages are less than said handoff threshold, or call releases.

18. The method as recited in claim 17 further comprising the steps of:

setting a handoff guard timer after sending said handoff request; and returning to step (a) if said handoff guard timer expires before a handoff command is received from said controller.

19. A method of determining, in a cellular system, a time for handing off a phone call on a mobile station on a particular voice channel in one cell site to a voice channel in another cell site, the method comprising the steps of:

comparing a first signal value indicative of a long term averaged signal strength of a received signal from a mobile station, to a predetermined threshold;

comparing a second signal value indicative of a short term value of said received signal to said threshold; and determining that said handoff condition exists if both said first and second signal values are below said threshold;

if said second signal value is not less than said threshold, continuing checking said second signal value until one of both said first and second signal values indicate that a handoff condition exists; and initiating handoff of said call to said voice channel in another cell site when said handoff condition is met.

20. A method of determining, in a cellular system, a time for handing off a phone call on a mobile station on a particular voice channel in one cell site to a voice channel in another cell site, the method comprising the steps of:

sampling signals received from said mobile station to determine a signal strength of said received signals at predetermined intervals and outputting a received signal strength indication (RSSI) sample at said predetermined intervals;

calculating a long term average of said samples at said predetermined intervals once a predetermined number of said samples have been received;

calculating a short term average of said samples;

comparing said long term average to a predetermined threshold value;

comparing said short term average to said threshold value if said long term average is below said threshold value;

determining that said handoff condition exists if both said long term and short term averages are below said threshold value;

if said short term average is not less than said threshold value, continuing checking said short term average until one of both said short and long term averages indicate that a handoff condition is met; and initiating handoff of said call to said voice channel in another cell site when said handoff condition is met.

21. A voice channel apparatus for determining, in a cellular system, a time for handing off a phone call on a mobile station on a particular voice channel in one cell site to a voice channel in another cell site, said apparatus comprising:

a receive channel for receiving signals from said mobile station;

a cell controller interface for receiving a threshold value from a cell controller;

a controller, receiving samples representing a signal strength of said received signals from said receive channel, said controller maintaining a long and short term buffer and storage locations for a long term average of said long term buffer and a short term average of said short term buffer, said controller including a processor which determines a handoff condition when both said long term average and said short term average are less than said threshold value, said controller continuing checking said short term average if said handoff condition is not met until one of both said long and short term averages is less than said threshold value, said controller sending a handoff request, including said short term average, to said cell controller through said cell controller interface upon determination of said handoff condition.

22. A method of determining, in a cellular system, a time for handing off a phone call on a mobile station on a particular voice channel in one cell site to a voice channel in another cell site, the method comprising the steps of:

comparing a first signal value indicative of a long term averaged signal strength of a received signal from said mobile station, to a predetermined threshold value;

comparing a second signal value indicative of a short term value of said received signal strength to said threshold value only if said first signal value is below said threshold value;

determining that a handoff condition exists if both said first and second signal values are below said threshold; and initiating handoff of said call to said voice channel in another cell site when said handoff condition is met.

23. A method of determining, in a cellular system, a time for handing off a phone call on a mobile station on a particular voice channel in one cell site to a voice channel in another cell site, the method comprising the steps of:

comparing a first signal value indicative of a long term averaged signal strength of a received signal from said mobile station, to a predetermined fixed threshold value;

comparing a second signal value indicative of a short term value of said received signal strength to said threshold value if said first signal value is below said threshold value;

determining that a handoff condition exists if both said first and second signal values are below said threshold; and initiating handoff of said call to said voice channel in another cell site when said handoff condition is met.

* * * * *